F. A. HART.
ADDING TYPE WRITER.
APPLICATION FILED APR. 16, 1906.

961,073.

Patented June 7, 1910.
14 SHEETS—SHEET 1.

Witnesses
J. P. Stinkel
J. J. McCarthy

Inventor
Frederick A. Hart
by Foster Freeman Watson
Attorneys

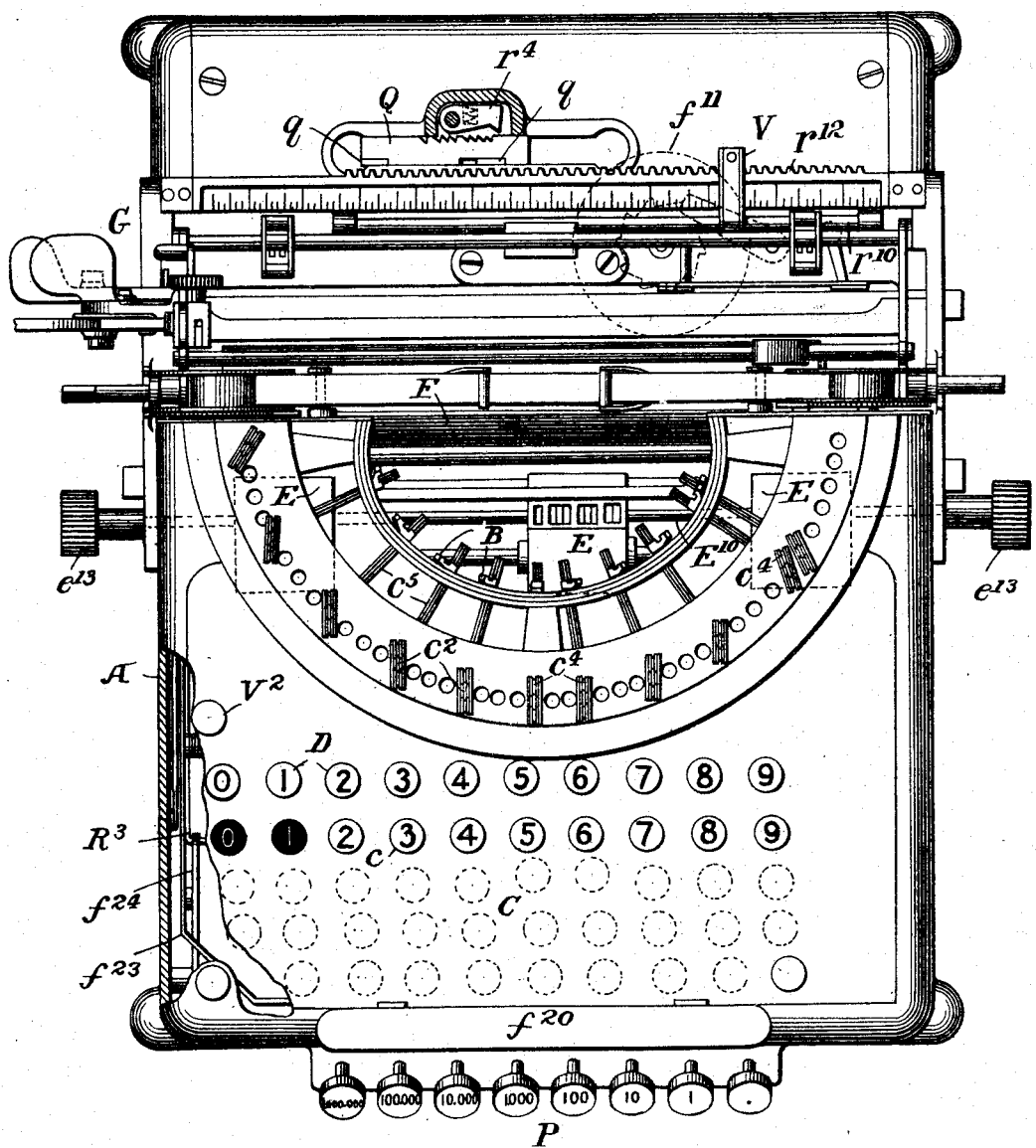

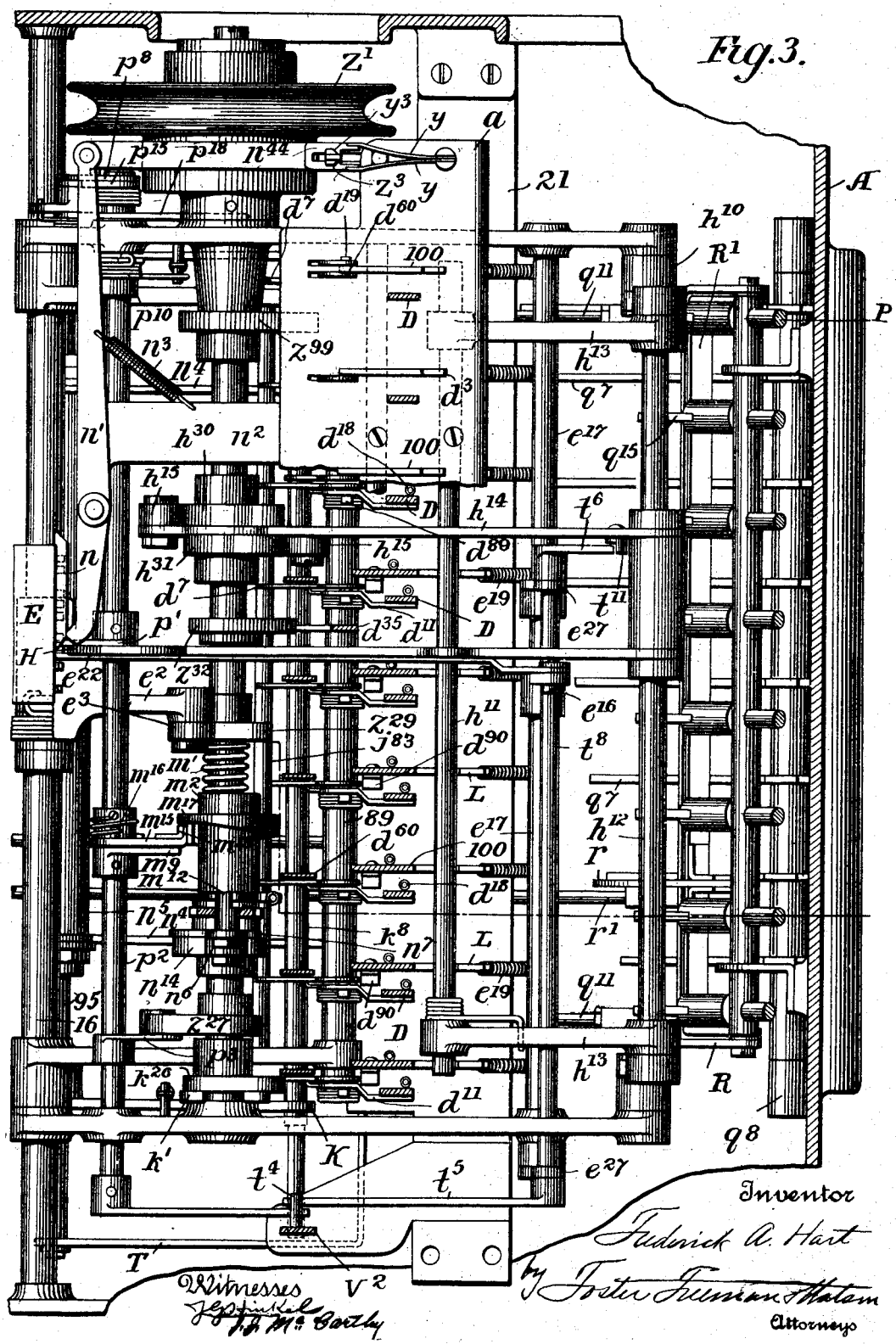

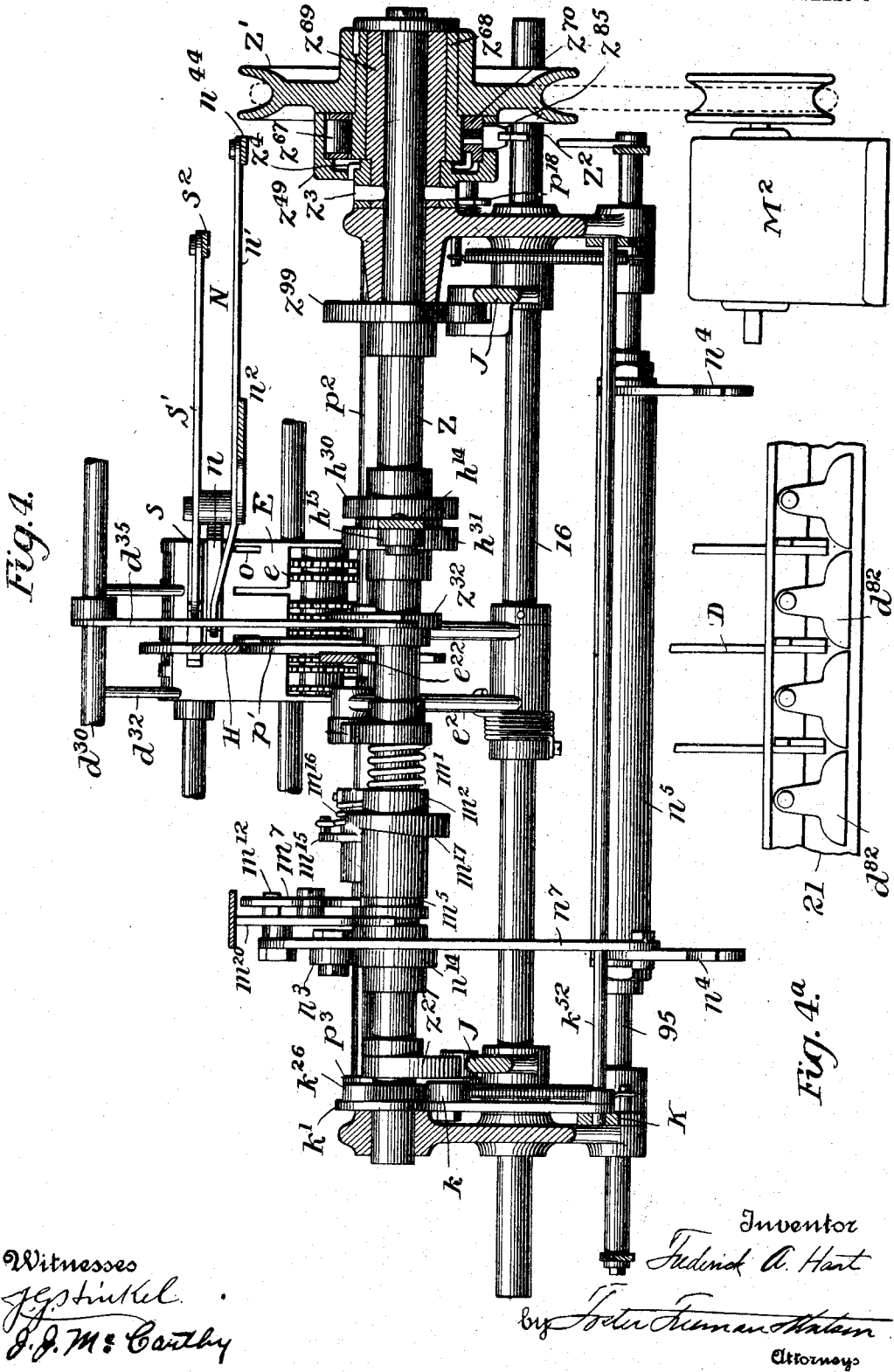

F. A. HART.
ADDING TYPE WRITER.
APPLICATION FILED APR. 16, 1906.
961,073.
Patented June 7, 1910.
14 SHEETS—SHEET 5.
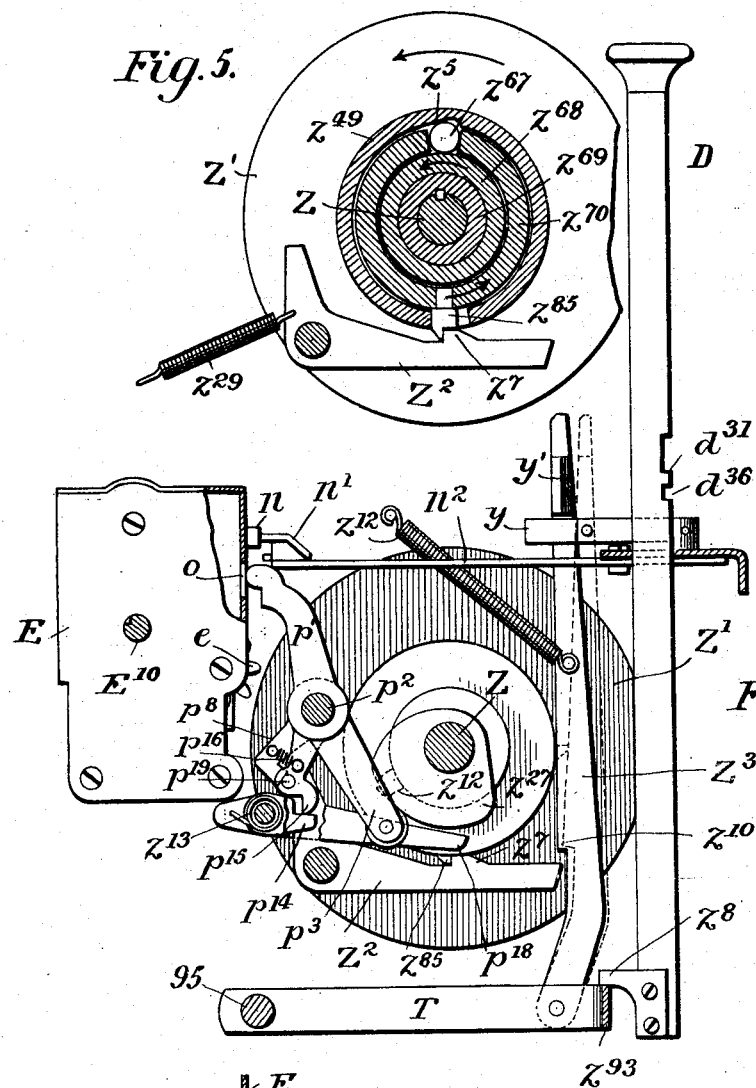
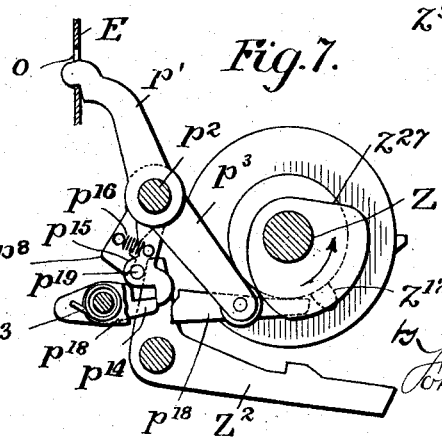

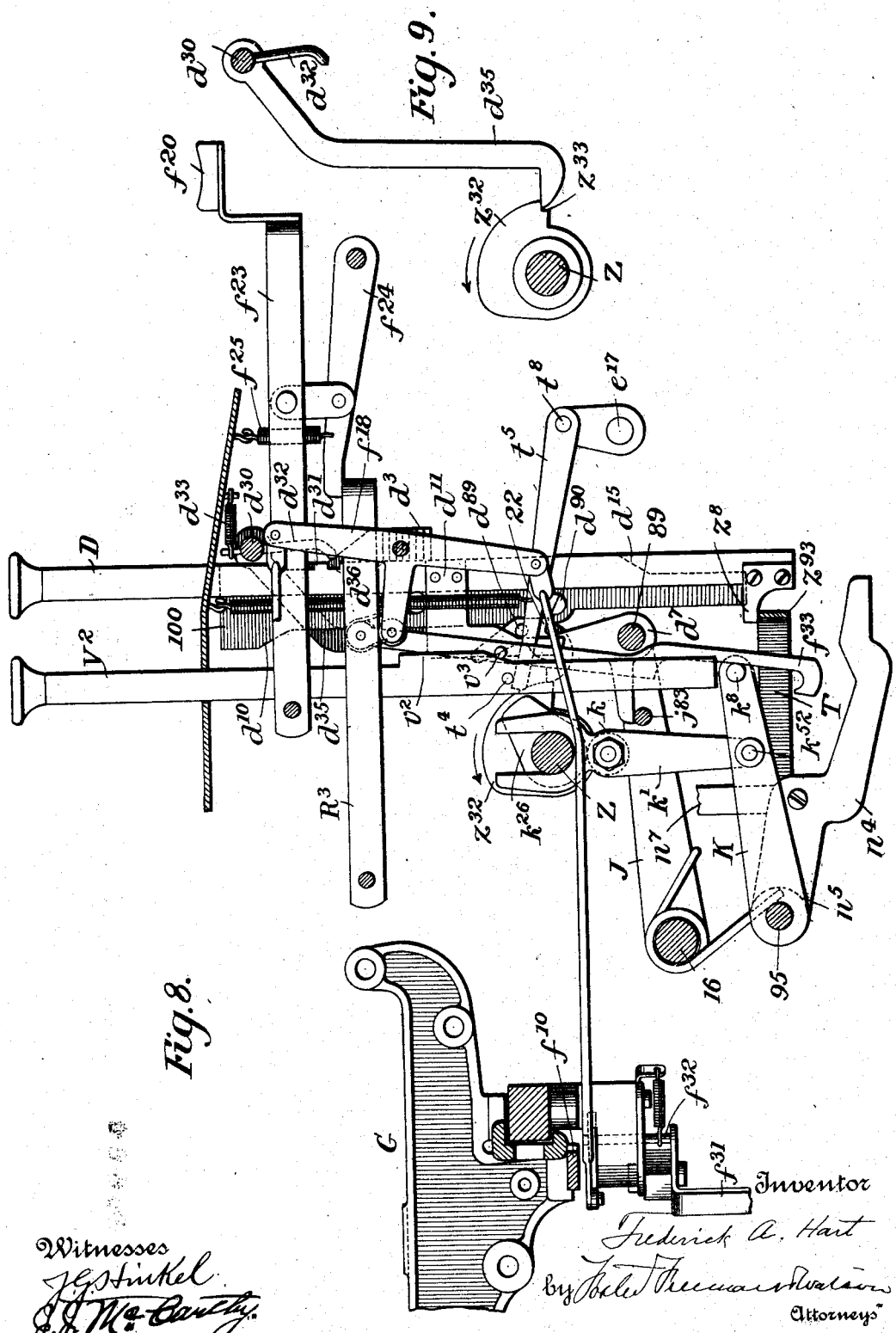

F. A. HART.
ADDING TYPE WRITER.
APPLICATION FILED APR. 16, 1906.
961,073.
Patented June 7, 1910.
14 SHEETS—SHEET 8.
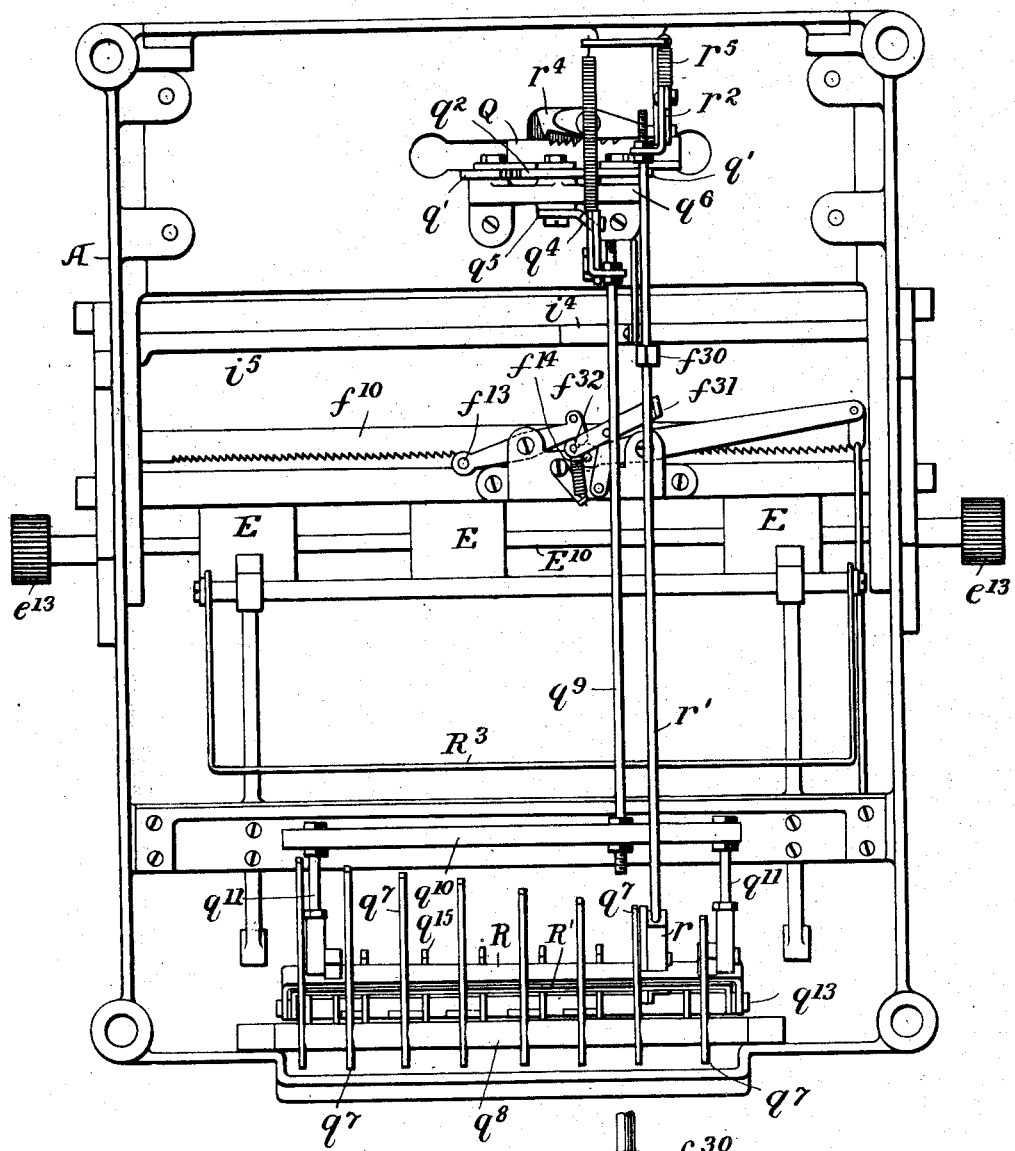
Fig. 12.
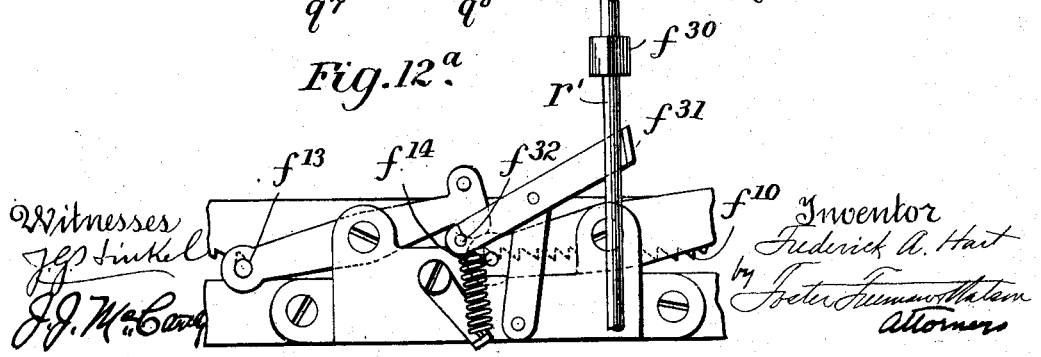
Fig. 12.ᵃ

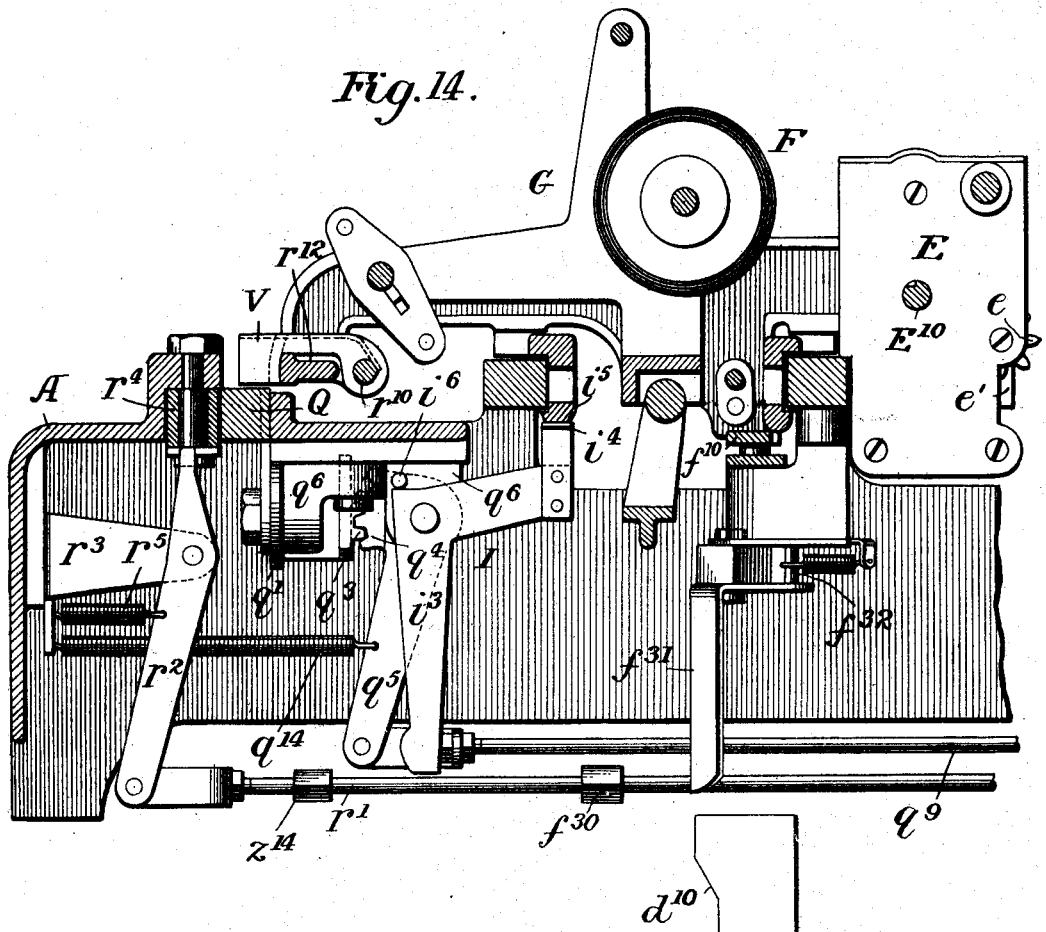
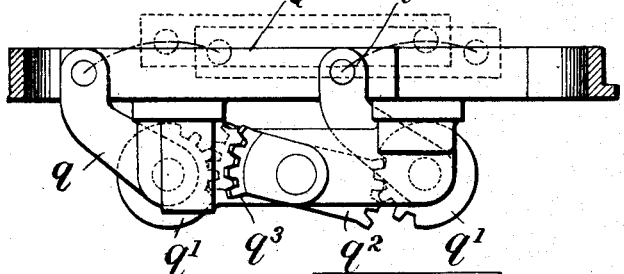
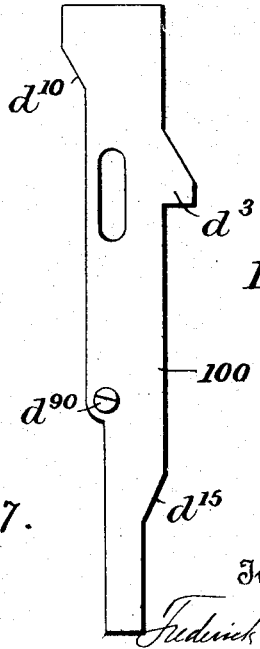
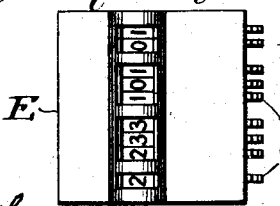

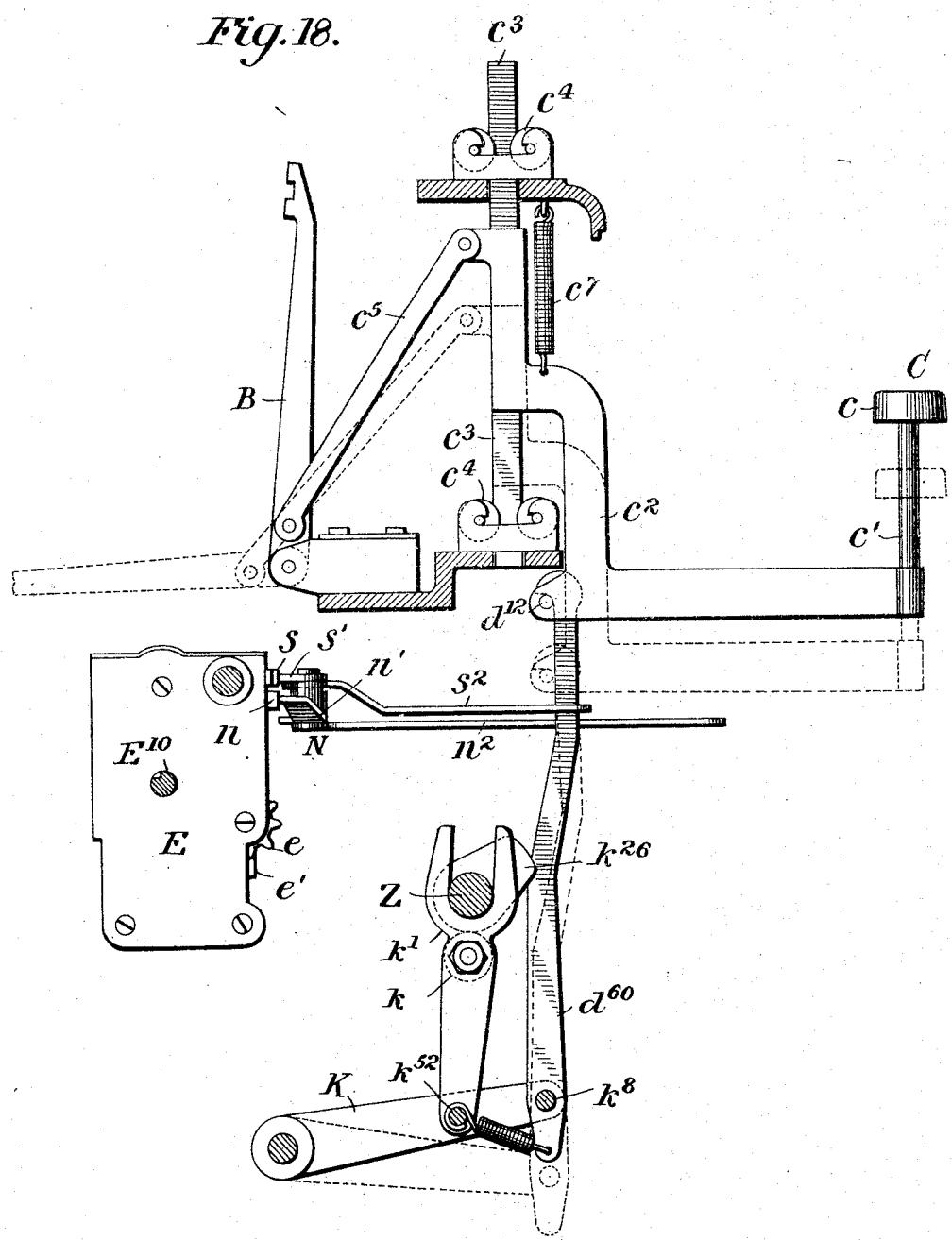

F. A. HART.
ADDING TYPE WRITER.
APPLICATION FILED APR. 16, 1906.

961,073.

Patented June 7, 1910.
14 SHEETS—SHEET 12.

Witnesses
J. G. Stinkel
J. J. McCarthy

Inventor
Frederick A. Hart
by Foster Freeman Watson
Attorneys

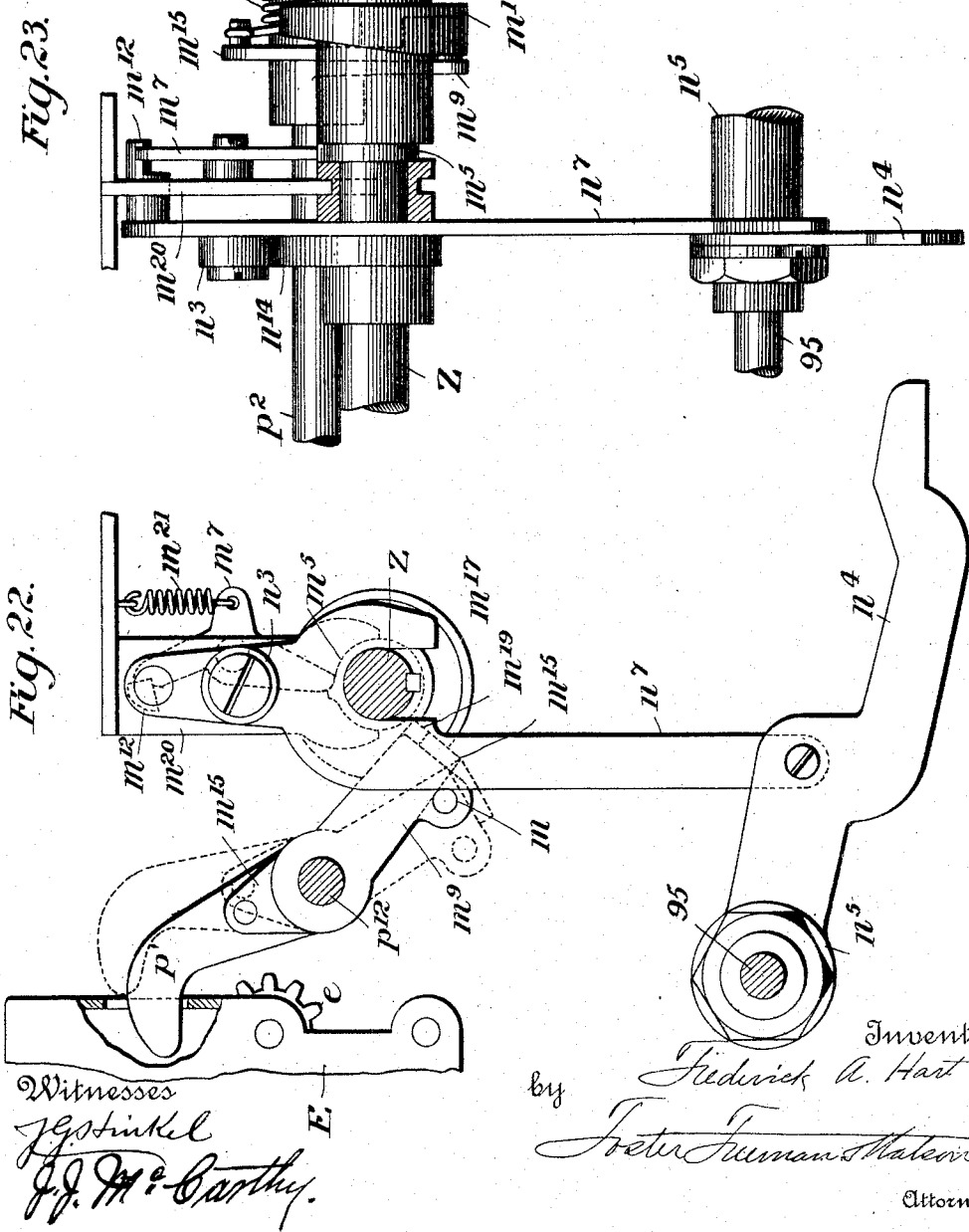

F. A. HART.
ADDING TYPE WRITER.
APPLICATION FILED APR. 16, 1906.

961,073.

Patented June 7, 1910.
14 SHEETS—SHEET 14.

Witnesses

Inventor
Frederick A. Hart
by
Foster Freeman Slalem
Attorneys

UNITED STATES PATENT OFFICE.

FREDERICK A. HART, OF ORANGE, NEW JERSEY, ASSIGNOR TO NEW YORK ADDING TYPEWRITER COMPANY, OF ORANGE, NEW JERSEY, A CORPORATION OF MISSOURI.

ADDING TYPE-WRITER.

961,073.     Specification of Letters Patent.     Patented June 7, 1910.

Application filed April 16, 1906. Serial No. 311,964.

*To all whom it may concern:*

Be it known that I, FREDERICK A. HART, a citizen of the United States, residing at Orange, Essex county, State of New Jersey, have invented certain new and useful Improvements in Adding Type-Writers, of which the following is a specification.

The present invention relates to improvements in combined typewriter and adding machines, and is illustrated in the accompanying drawings, in which,—

Figure 1:
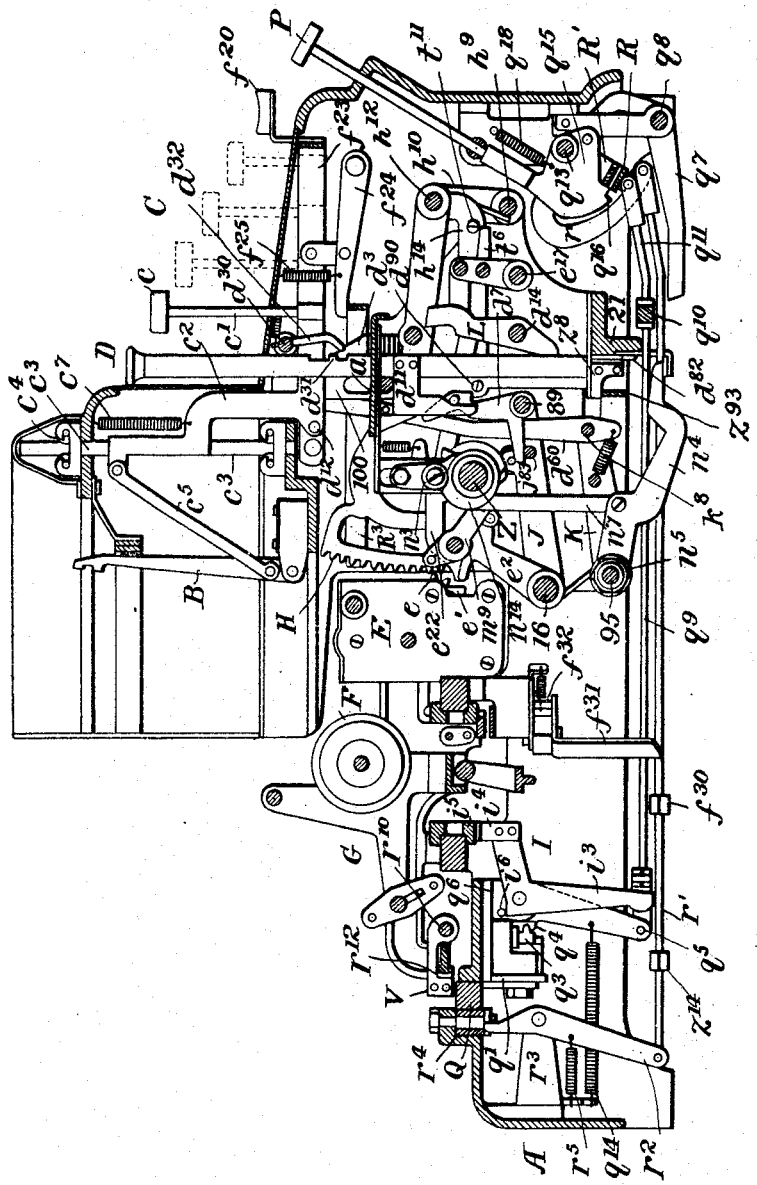
Figure 10:
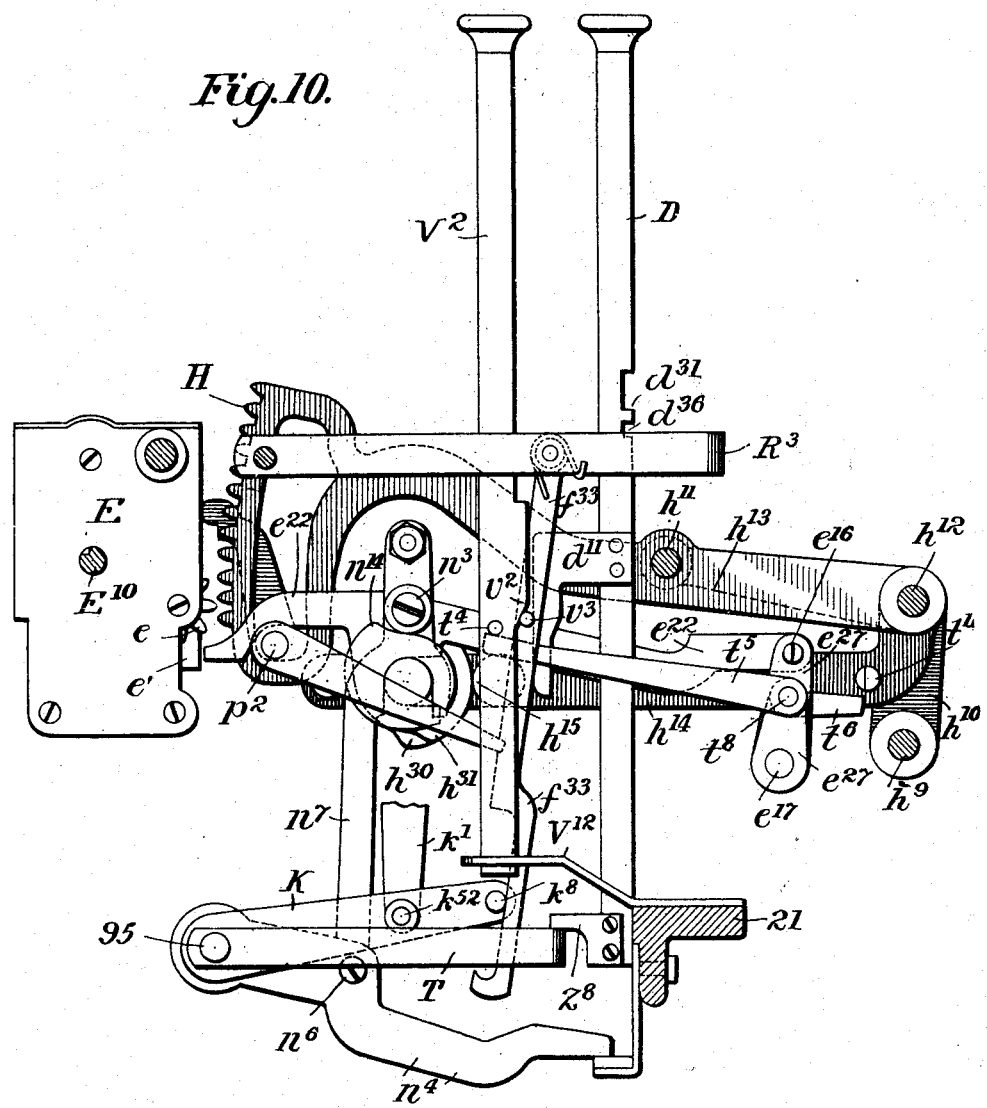
Figure 11:
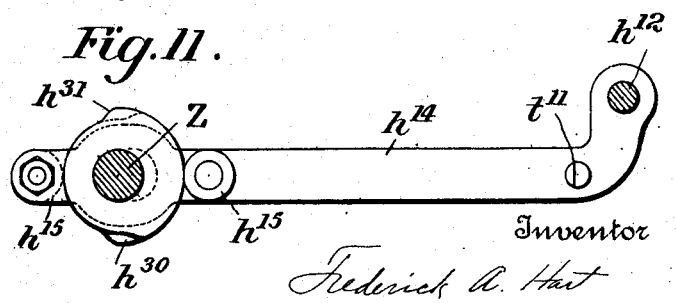
Figure 13:
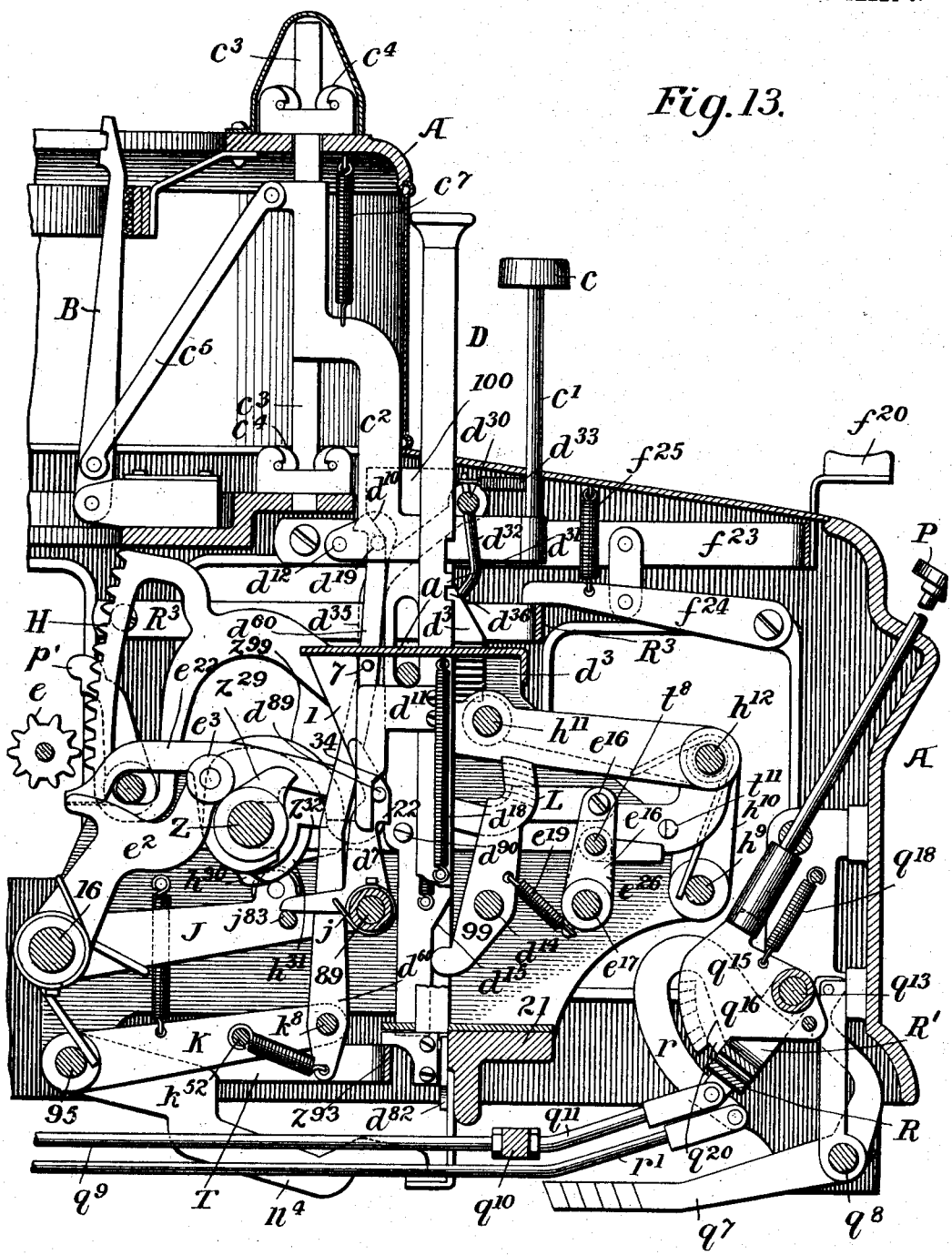
Figure 19:
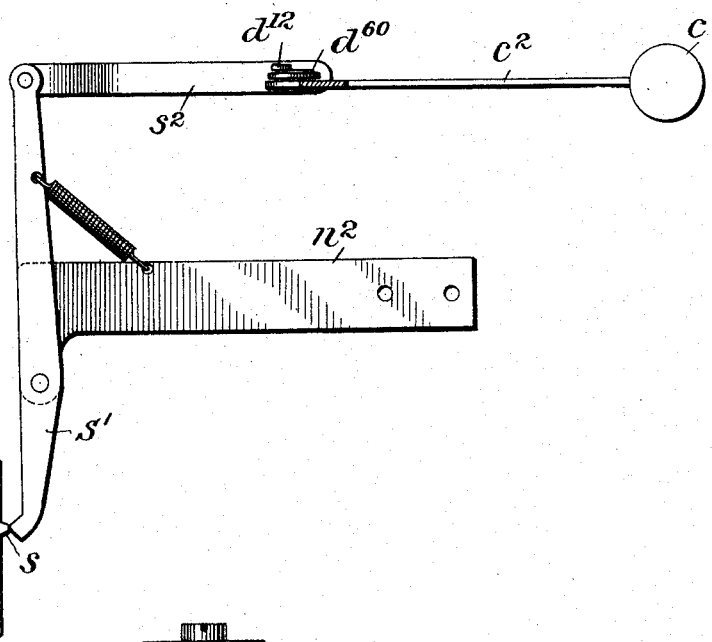
Figure 20:
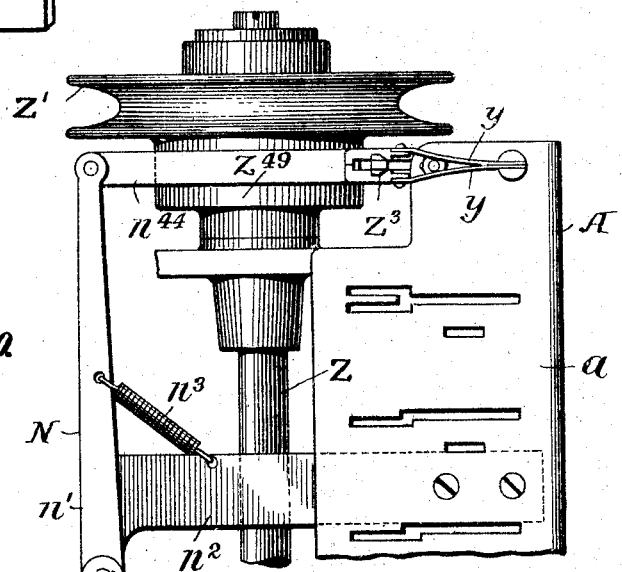
Figure 21:
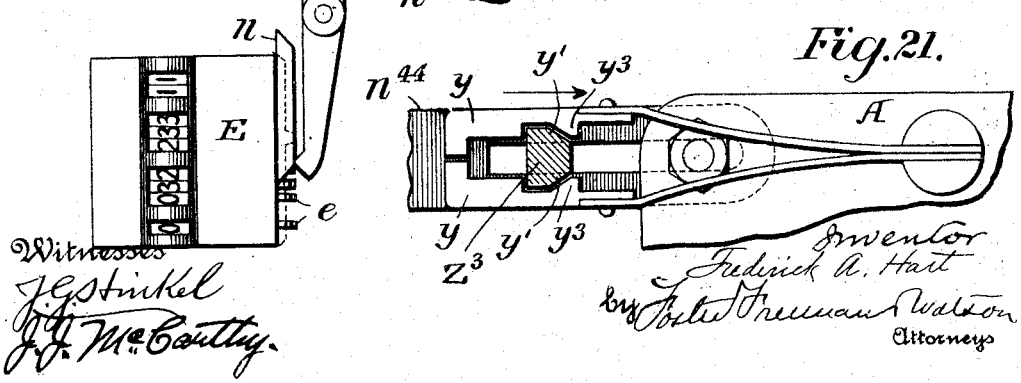
Figure 24:
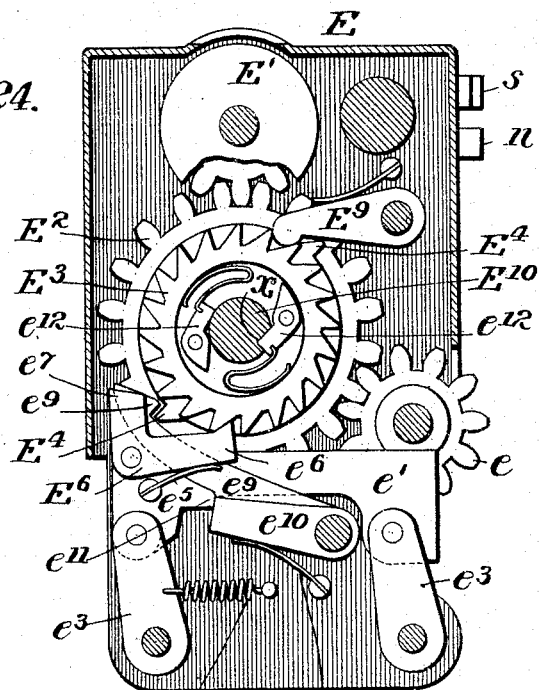
Figure 25:
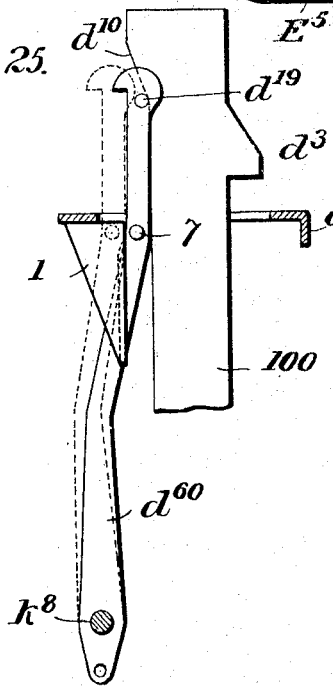
Figure 26:
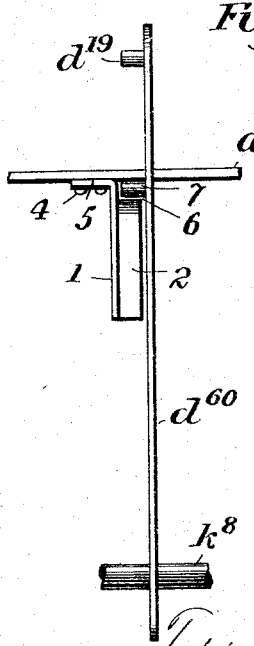

Figure 1 is a vertical sectional view through a combined typewriting and adding machine embodying the improvements constituting the present invention; Fig. 2 is a plan view of the machine; Fig. 3 is a horizontal sectional view, on an enlarged scale, of a portion of the machine; Fig. 4 is an elevation, partly in section, of the power shaft and devices for driving the same; Fig. 4ᵃ is a detail view of stop mechanism for the shifters; Fig. 5 is a sectional view through the clutch mechanism connecting the power shaft with its driving devices; Fig. 6 illustrates the devices for releasing the detent normally holding the power shaft stationary; Fig. 7 is a detail of some of the parts employed for permitting two successive revolutions of the power shaft; Fig. 8 illustrates the devices actuating the platen carriage feed mechanism; Fig. 9 is a detail view of a locking device for the shifters; Fig. 10 illustrates the actuating sector and devices for reciprocating and vibrating it; Fig. 11 is a detail view of the blade which reciprocates the actuating sector; Fig. 12 is a bottom view of the carriage feeding and tabulating mechanism; Fig. 12ᵃ is a detail, on an enlarged scale, of the carriage feed escapement; Fig. 13 is a vertical sectional view, on an enlarged scale, through a portion of the machine; Fig. 14 is a similar view of the rear section of the machine not shown in Fig. 13; Fig. 15 is a detail view of the adjustable tabulator block on the frame of the machine, and the manner of mounting the same; Fig. 16 is a detail view of one of the cam blades which is adapted to form a part of the connection between the power shaft and the recording devices; Fig. 17 is a plan view of an adder detached; Fig. 18 illustrates the devices by which a decimal point is automatically printed between the dollars and cents columns; Fig. 19 is a plan of part of the devices shown in Fig. 18; Fig. 20 is a plan view of the devices for preventing operation of the actuating sector except when an adder is in position to be operated thereby; Fig. 21 is a plan view, on an enlarged scale, of part of the devices shown in Fig. 20; Figs. 22 and 23 illustrate details of the devices employed for permitting two consecutive rotations of the power shaft under certain conditions; Fig. 24 is a sectional view, on an enlarged scale, through the adder; Figs. 25 and 26 are detail views.

The apparatus is provided with a frame upon which is supported the recording mechanism, including a traveling platen, and operating keys, and with the platen is carried the adding mechanism, which parts and devices may be of any usual or suitable construction.

In the construction shown, the frame A is of any desired construction to support the operating parts, there being keys C for typewriting including a series of numeral keys $c$; a recording mechanism, the members of which are type levers B, and a carriage G supporting a platen F; one or more accumulators or adding mechanisms E also supported by the carriage; and a series of devices D preferably numbered and arranged adjacent to the numeral keys $c$ and which I term "shifters," as they do not operate any part of the mechanism to accumulate or print, but serve to shift parts into position to be actuated, or to actuate, the operating mechanism. These shifters may also shift the position of a detent or starting device to insure a connection with the driving mechanism and start the machine.

The keys C act to directly actuate type levers as in ordinary typewriters, each key being secured to a stem $c'$, Figs. 1, 13, 18, connected to a sliding frame $c^2$ having a guide rod $c^3$ moving between guide rollers $c^4$ and connected near its upper end to a link $c^5$ which is connected at the lower end to a type lever near the pivotal point thereof, a spring $c^7$ elevating the frame after pressure is removed from the key. These operations are of usual character and the construction does not involve any feature of my invention.

In operating the adding mechanism, the parts shifted by the shifters D are put into position to connect said mechanism with an operating motor that actuates a working shaft Z from which the type levers and other parts are moved, means being employed to disconnect the parts from the shaft after a single complete operation. Different intermediate devices may secure these results. As shown, the action of the shaft Z in one rotation is to carry a rack H, shown as a toothed sector, into engagement with the opposite pinion $e$ of a series of pinions of the adder E, the sector then moving downward to an extent depending upon which shifter had been operated, and, after the pinion has been turned sufficiently to add the number or the amount indicated by said shifter, the sector H is withdrawn from engagement with the pinion and resumes its upper normal position. The effect of thus turning the pinion $e$ is the same as in adders of usual type.

The sector is moved in and out of position to engage the pinions $e$ by a link or blade $h^{14}$, Figs. 1, 3, 11, which is connected by a cross bar $h^{12}$ to links $h^{10}$, vibrating on a cross bar $h^9$, and said sector forms part of, or is carried by, a carrier frame including the cross bar $h^{12}$ and having side bars $h^{13}$, Fig. 3, and a cross bar $h^{11}$; and the blade $h^{14}$ carries two rollers $h^{15}$, $h^{15}$, upon opposite sides adapted to engage two cams $h^{30}$, $h^{31}$, upon the shaft Z. These cams act successively one to carry the frame and sector toward the adder, and the other to then retract the same after the sector had descended, thus securing a positive movement in each direction.

Coöperating with and adjacent to each shifter D is a vertical cam blade or plate 100, Figs. 1, 3, 9 and 16, having cam surfaces or inclined edges $d^{10}$ and $d^{15}$, and a lug $d^{90}$ extending from one side of the plate is adapted to be engaged by the hook or shoulder 22, Figs. 8 and 13, of a catch $d^7$ pivoted to the cross bar 89 of a frame J pivoted at 16 to the main frame.

A series of hooks $d^{60}$, Figs. 1, 18 and 25, are pivoted each at the lower end to the cross bar $k^8$ of a frame K pivoted at 95 to the main frame, and the frame K is depressed by the action of a cam $k^{26}$, Figs. 3, 8, 18, upon the shaft Z acting upon the roller $k$ of a forked blade $k'$ pivoted to the frame K.

The stem of each shifter D carries a bracket $d^{11}$, Fig. 13, with an inclined cam edge 34 adapted to engage a lug $d^{89}$ at the side of the adjacent catch $d^7$ so that when the shifter is depressed, the catch $d^7$ will be thrown forward to bring its hook or shoulder 22 over the lug or stud $d^{90}$ of the adjacent cam plate 100, and when the frame J is thereafter swung downward, the catch will descend and carry with it the cam plate, which, through any suitable connections, operates one of the numeral type levers. The depressing of the shifters, however, does not in any way of itself move the type lever. The downward motion of the frame J results from the rotation of the shaft Z through suitable devices, as for instance, a cam $z^{99}$ upon the shaft Z, engaging a roller on the frame J, the cam plate and shifter being lifted by suitable springs. The tail of the catch $d^7$ extends over a rod $j^{83}$, a spring $j$, Fig. 13, tending to carry the tail down against the rod. As the cam plate 100 begins to move downward under the action of the frame J and its adjuncts, the catch $d^7$ having engaged the stud $d^{90}$, the cam edge $d^{10}$, Figs. 8, 13, 16, bearing upon a lug $d^{19}$ at the side of the adjacent hook $d^{60}$, carries the latter over a stud $d^{12}$ upon the side of the frame $c^2$ of the adjacent numeral typewriter key and as the frame K swings down it depresses the hook $d^{60}$ and its connected type lever. It will therefore be seen that the depression of any one of the shifters D first sets the co-acting catch $d^7$ in position; and the rotation of the cam $z^{99}$ acting upon the frame J, depresses the catch $d^7$ and carries down the co-acting cam plate 100. This throws backward the adjacent hook $d^{60}$ which, with the adjacent frame $c^2$, is carried down by the movement of the frame K and the connected type bar is thrown downward and makes the requisite imprint upon the paper on the platen F.

It will be evident that the shifter D is not a typewriter key or actuating key in any sense, but is simply a means for shifting into position the parts which are thereafter actuated by the motor, also started by said means, as hereinafter described, to depress the type lever.

The extent to which the rack or sector H is depressed depends upon the particular cam plate which is operated, each of the said cam plates having a wing $d^3$, Figs. 13 and 16, which is above the aforesaid cross bar $h^{11}$ of the sector carrying frame, and these wings $d^3$ are at successively greater distances from said cross bar, corresponding to the value of the number upon the shifters co-acting with the cam plates respectively, so that the cam plate adjacent to the shifter having the highest figure will have its wing brought into contact with the cross bar $h^{11}$ directly after the cam plate begins its downward movement, while the wing of the cam plate co-acting with the shifter having the lowest figure will only be brought into contact with the cross bar $h^{11}$ just before the cam plate has completed its downward movement.

To secure a positive throw and movement of the sector H and prevent it from exceeding the precise extent of movement required, there is a series L of stop levers 99, Fig. 13, pivoted to a cross bar $d^{14}$ and so arranged that the tail of each lever is opposite the edge $d^{15}$ of one of the cam plates, so that on the descent of the latter, the cam edge $d^{15}$ thereof will bear on this tail and swing the upper end of the stop lever backward into the path of the bar $h^{11}$ of the sector frame, said levers being of different lengths so that the upper end of each lever will define exactly the lowest position of the sector which is carried down by the wing $d^3$ co-acting with the stop lever which is thrown backward.

While some of the parts of this apparatus may obviously be employed in connection with a hand operated machine, as shown the apparatus is intended to be driven from a suitable source of power, as for instance from a constantly rotating pulley Z′, Figs. 3, 4 and 6 turning upon a sleeve $z^{69}$, Fig. 4, secured to the shaft Z, and this pulley may be brought into connection with the shaft to impart a single rotation thereto and then be automatically disconnected therefrom as a result of depressing any one of the shifters D. Between the pulley Z′ and the shaft Z are any suitable clutch devices. As shown, the pulley carries a hardened steel sleeve or bushing $z^{68}$, Figs. 4 and 5, and about the latter is arranged loosely a ring $z^{70}$ notched to receive a hardened cylinder or roller $z^{67}$. The ring and its roller are inclosed by a muff $z^{49}$ which is keyed by a key $z^3$ Fig. 4 to the shaft Z, and a coiled spring $z^4$ is connected at one end to the muff and at the other to the ring $z^{70}$. From the ring $z^{70}$ extends a pin $z^{85}$ which projects through a slot in the muff and the spring $z^4$ tends to turn the ring to throw the pin $z^{85}$ in the direction of the rotation of the shaft, Fig. 5. Within the muff is an inclined face $z^5$ opposite the roller $z^{67}$ and normally a detent $Z^2$ engages, by its shoulder $z^7$, the pin $z^{85}$ and tends to hold the parts in the position shown in Fig. 5, when the shaft is stationary, while the pulley Z′ constantly rotates. When the detent $Z^2$ is depressed, and the pin $z^{85}$ released, the spring $z^4$ throws the ring $z^{70}$ in the direction of its arrow, Fig. 5, and carries the roller $z^{67}$ between the sleeve $z^{68}$ and the inclined face of the muff so that the latter is clutched to the sleeve $z^{68}$, and therefore to the pulley Z′ connected to said sleeve, and the muff and its shaft connected thereto are compelled to turn with the pulley. The parts are so arranged that on depressing any shifter when the parts are in proper position, the detent $Z^2$ will be depressed and the shaft Z connected with its driving wheel. The detent $Z^2$ is carried to its normal position by a spring $z^{29}$ after the pin $z^{85}$ passes from contact with the same, and as the rotation is completed, said pin again strikes the shoulder $z^7$ and a slight rotation of the muff and shaft is permitted by the compression of the spring $z^4$, while the ring remains stationary and this carries the inclined surface $z^5$ of the muff to a position to release the grip on the roller $z^{67}$, so that the wheel Z′ can turn without turning the shaft. The detent $Z^2$ is operated from any one of the shifters D, each shifter having a lug $z^8$, Fig. 6, adapted to engage a cross bar $z^{93}$ of a frame T pivoted at 95 to the main frame, and to this frame T is pivoted the lower end of a catch $Z^3$, a shoulder $z^{10}$ on which is adapted to engage the end of the detent $Z^2$. A spring $z^{12}$ tends to lift the catch $Z^3$ and also carry it toward the detent $Z^2$. On depressing any shifter, the frame T is depressed with the catch $Z^3$ which depresses the detent $Z^2$ so that the pin $z^{85}$ escapes the shoulder $z^7$ and the shaft Z begins its rotation. As the shaft turns the pin $z^{85}$ makes contact with the catch $Z^3$, and pushes it forward, thus releasing the detent which is immediately lifted by its spring to position to intercept and engage the pin $z^{85}$ and arrest the shaft Z on the completion of its rotation.

When any one of the shifters D is depressed, the other shifters must be locked in their elevated position. This is effected by means of a series of locking pawls $d^{82}$, Figs. 1 and $4^a$, pivoted to a cross bar 21 of the frame and so closely arranged that they may swing aside or separate sufficiently to permit the stem of one of the shifters to pass between them, but are then so close together that the other shifter stems cannot descend between them.

If a shifter was struck percussively and could immediately return to its elevated position, the catch $d^7$ might not remain above the stud $d^{90}$ for a sufficient length of time to insure the proper engagement of the catch and stud, and it is therefore desirable to hold the shifter stem in its downward position after being struck, for a sufficient length of time to insure the proper co-action of the parts. This is insured by providing the stem of each shifter with a shoulder $d^{31}$, Figs. 6, 8 and 13, adapted to engage one of a series of fingers $d^{32}$ upon a rock shaft $d^{30}$ which extends across the stems of all the shifters and is swung to carry the fingers $d^{32}$ toward the stems by means of a spring $d^{33}$. This movement, however, is limited by a cam $z^{32}$, Figs. 8 and 9, upon the shaft Z, which cam engages an arm $d^{35}$ extending from the shaft $d^{30}$ and passes from engagement with said arm immediately after the shaft Z begins a rotation. On the escape of the cam from the arm $d^{35}$, the spring $d^{33}$ will rock the shaft $d^{30}$ and carry the fingers $d^{32}$ backward, and the end of the finger $d^{32}$ adjacent or in line with the depressed shifter will pass to a position above the shoulder $d^{31}$ on said shifter and hold the stem of the shifter down, and the other fingers $d^{32}$ will extend into recesses $d^{36}$, Fig. 6, of the stems of the other shifters. As the shaft Z continues to rotate, the cam $z^{32}$ will engage the arm $d^{35}$, rock the shaft $d^{30}$ and carry all of the fingers forward, when the depressed shifter will be released and will be carried upward by its spring $d^{18}$, Fig. 13, the cam and the shaft Z being arrested with the parts in the position Fig. 10. A notch $z^{33}$ is formed in the cam $z^{32}$ into which the end of arm $d^{35}$ will extend when the parts are in the positions shown in Fig. 9. The engagement between the cam $z^{32}$ and the arm $d^{35}$ just described will act to positively prevent any backward movement of the shaft Z which would produce a vibration of the roll or cylinder $z^{67}$ in the clutch.

It will be understood that any suitable number of accumulators or adders E may be supported upon the carriage, and while various forms of such devices may be employed with the other parts of the machine, I prefer to employ the construction illustrated, in which nine numeral wheels E' are mounted on a suitable shaft $E^{10}$ within the casing of the adder, each of said wheels E' being connected directly or indirectly with a ratchet wheel $E^3$. As shown, particularly in Fig. 24, a gear connected with each numeral wheel E' engages a gear $E^2$ which is connected with one of the ratchets $E^3$. The gears $E^2$ are twice the diameter of the numeral wheels E', so that each of the latter rotates once to each half rotation of its actuating gear $E^2$. It will be understood that there is a ratchet $E^3$ and gear $E^2$ for each of the numeral wheels E' and as shown each ratchet $E^3$ is connected with its associated gear $E^2$ and with a ring provided at diametrically opposite points with laterally projecting lugs $E^4$. A reciprocating carrier $e'$ is arranged beneath each ratchet wheel, and as shown consists of a frame supported by two links $e^3$, a spring $E^5$ tending to carry said frame outwardly from the casing E. To said reciprocating frame is pivotally connected an L-shaped pawl $E^6$, with which engages a spring $e^5$, so that one arm $e^6$ will engage the teeth of the adjacent ratchet $E^3$ to turn the latter one step as the reciprocating frame moves outwardly. The turning movement of the ratchet, under the influence of this outward movement of the reciprocating frame, is limited by the heel $e^7$ of the pawl $E^6$ being brought beneath a tooth of the ratchet as the carrier reaches its outer position, any overthrow of the ratchets being thus prevented. The upper face of said heel is parallel to the inclined face of the contacting ratchet teeth, and when in engaging position, both are nearly horizontal so that the inward movement of the reciprocating carrier has no tendency to cause the ratchet wheel to change its position. The inward movement of the carriers, which puts the springs $E^5$ under stress is effected by power as by the contact of a pusher $e^2$ (Fig. 13). This pusher is pivoted on a shaft 16 and provided with an arm carrying a roller $e^3$ arranged to be engaged by a cam $Z^{29}$ on the shaft Z, the parts being so proportioned and arranged that at the commencement of each rotation of the shaft Z the pusher $e^2$ will force all of the carriers $e'$ inwardly.

Beneath each reciprocating carrier $e'$ is pivoted a two armed detent or pawl which is normally pressed upward by a spring $E^8$, one arm $e^9$ of said pawl having an inclined beveled end adapted to alternately engage the lugs $E^4$ so that as the wheel $E^2$, with which said lugs are connected, completes a half rotation the arm $e^8$ will be moved downwardly. This movement carries the other arm $e^{10}$ of said two armed detent away from a shoulder $e^{11}$ of that carrier $e'$ which coöperates with the wheel $A^2$ of the next higher denomination, permitting the latter carrier to move outwardly under the power of its spring $E^5$ and turn the co-acting ratchet wheel $E^3$ and its connections one step.

To avoid any possibility of the ratchet $E^3$ and connections being improperly turned when the carrier $e'$ has moved inwardly, a spring depressed detent pawl $E^9$, with a rounded end, engages the teeth of the ratchet wheel, as shown, or any other suitable detent may be employed. Each ratchet wheel $E^3$ carries two oppositely arranged pawls $e^{12}$, either of which is adapted to engage the shoulder $x$ of a longitudinal groove in the shaft $E^{10}$ on which the wheels $E^2$, $E^3$ turn, and which shaft may be rotated by means of suitable knobs $e^{13}$ (Figs. 2 and 12) at its end, to bring the wheels of the adder to zero position.

In the construction shown, where the wheels $E^2$ are twice the diameter of the numeral wheels E', the carrier $e'$ being in its inner position, when each ratchet wheel $E^3$ completes one half a rotation with its wheel $E^2$, one of the lugs $E^4$ of the latter will press back the pawl $e^9$ co-acting with the wheel of the next higher denomination and as the arm $e^{10}$ connected with said pawl passes from the shoulder $e^{11}$, the co-acting carrier $e'$ is released, and by its outward movement, under the action of spring $E^5$, rotates its wheels $E^3$, $E^2$ and E' one step and then locks the same from further rotation. To restore the wheels to zero position, it is first necessary to throw the carrying devices out of action, and this is done by first moving all of the carriers $e'$ inwardly. The shaft $E^{10}$ may now be turned by means of its knob $e^{13}$ until the shoulder $x$ engages one of the pawls of the wheel $E^3$ that has been turned to the least extent, and then the others successively, which will turn all of the wheels until one of the lugs $E^4$ of each wheel or train strikes the shoulder of the adjacent arm $e^9$ which, being depressed, releases the carrier $e'$ and the spring $E^5$ moves the carrier outwardly. By this operation the heels $e^7$ of all the pawls $E^6$ are brought into engagement with the ratchets $E^3$ preventing further rotation of the wheels which are then in zero position. As the intermediate gear wheels $E^2$ have twice the number of teeth of the numeral wheels $E'$, only a half rotation of the shaft $E^{10}$ is required to restore all of the wheels to zero position.

While any suitable means may be employed to turn the adder wheels in accumulating I have shown pinions $e$ each engaging one of the wheels $E^2$ and, projecting beyond the face of the casing inclosing the parts of the adder, so that each may be engaged by proper actuating means, as the toothed sector H.

The casing of the adder is slotted above the numeral wheels so as to expose the numbers thereon, whether such wheels be the wheels $E'$ or the wheels $E^2$. It is preferable, however, to have the wheels $E^2$ of greater diameter than the wheels $E'$ to avoid unduly reducing the sizes of the parts.

It will be evident that the lugs or projections $E^4$ may be carried with the ratchet wheels in any suitable manner, and that where the intermediate wheels are not used or where they are of the same size as the wheels $E'$, there will be but one lug $E^4$ on each.

As the adder or adders E carried by the carriage G are comparatively narrow, the shifters D of the adding mechanism should be inoperative except when an adder is in proper position for its pinions $e$ to coöperate with the sector H, to which end I combine with the shifting devices a control device N, Figs. 3, 4 and 20, which serves to render the shifters inoperative except when an adder is in position for one of the pinions $e$ thereof to coöperate with the actuating sector. Such control device may be differently constructed, but as shown there is a projection or cam plate $n$ upon the frame of the adder E which, as the latter is brought into operative position, contacts with the end of a lever $n'$ pivoted to a fixed arm $n^2$ of the framework, Figs. 3 and 20, thereby swinging the contacting end of the lever forward against the stress of a spring $n^3$. This movement of the lever $n'$ shifts the position of a plate $n^{44}$, having a slot through which extends the upper end of the catch $Z^3$, and releases the catch $Z^3$ from a lock, hereinafter described, that prevents a downward movement of the catch when an adder is not in position to be actuated by the sector H.

To set the carriage in proper position to print and accummulate in the desired unit, tens, or other column, a block Q, movable in a slot in the base of the frame A, Figs. 1, 2, 12 and 15, is set to different positions, as shown in Fig. 15, to contact with a tabulator stop V upon the carriage, which stop V can normally pass over the block Q. The adjustment of the block Q may be effected in different ways from a series of tabulator keys P corresponding in number to the number of digits which either of the adders E can accumulate. The depressing of different keys sets the block to its different positions to so arrest the carriage that the print will take place in the column corresponding to the depressed key and the sector H will engage the corresponding pinion $e$. As shown, the block Q is pivoted to arms $q$ mounted on rock shafts carrying pinions $q'$ geared with an intermediate gear segment $q^2$ and the shaft of the latter carries a bevel sector $q^3$ which gears with a bevel sector $q^4$, Figs. 1, 12 and 14, upon the end of an arm $q^5$ pivoted to a bracket $q^6$ of the frame. The extent of swing of the lever $q^5$ governs the extent of movement of the block Q and this extent of movement of the lever $q^5$ is determined by devices intermediate the lever and the keys P.

As shown, Figs. 1, 12 and 13, there is a series of fingers $q^7$ of different lengths swinging on a cross bar $q^8$, and each capable of being swung into position to limit the forward movement of a cross bar $q^{10}$ connected with the lever $q^5$ by a rod $q^9$, the cross bar $q^{10}$ being pivoted by links $q^{11}$ to a frame R, swinging about a cross bar $q^{13}$. A spring $q^{14}$, Fig. 1, swings the lever $q^5$ backward, while a series of quadrants $q^{15}$ swinging on the bar $q^{13}$ and each operated from one of the keys P, have shoulders $q^{16}$ which are progressively arranged on the different quadrants, so that the extent to which the cross bar $q^{10}$ and rod $q^9$ are moved forward will depend upon the key depressed and the extent of movement thereby imparted to the frame R. The lower end of each key P bears on the edge of its quadrant which tends to rise under the action of a spring $q^{18}$. A second frame R' swings about the bar $q^{13}$ within the frame R, and carries a curved arm $r$ connected with a rod $r'$, jointed at its rear end to a lever $r^2$, Fig. 1, pivoted to a bracket $r^3$ of the frame, and a spring pawl $r^4$ pivoted below the top plate of the frame, Figs. 1, 2, 12, engages a rack at the side of the block Q to hold the latter in any position to which it is set until the stop V of the carriage has struck the block, when on the release of the key P that has set the block, the lever $r^2$ swings under the action of a spring $r^5$, and bearing on the tail of the pawl, carries it from the block which then swings down, allowing the carriage to travel thereafter under the action of the usual spacing devices. It will thus be seen that the depressing of any key P at once sets the traveling block Q into proper position and the release of the key brings the parts into position for the recording operations.

Referring to Fig. 13 it will be seen that the frame R' is engaged by a shoulder $q^{20}$ on each of the quadrants $q^{15}$ and is always moved the same distance when either of the keys P is depressed, whereas the extent of movement of the frame R depends on and varies according to the particular tabulator key which is operated. The effect of imparting the same extent of movement to the frame R' from each key P is to give a constant and definite stroke or movement to the rod $r'$ which first acts to move the lever $r^2$ and permit the spring pressed pawl $r^4$ to move into position to engage the teeth on the block Q. The continued movement of the rod $r'$ acts, through a projection $f^{30}$, hereinafter described, to release the carriage feed devices and, through a second projection $z^{14}$ to operate a brake I.

The stop V may be adjusted to stop the carriage in different positions according to the place on the paper where the column is to be printed or the location of the particular adder E. As shown in Fig. 2, the stop swings on a rod $r^{10}$, and when depressed engages and is held by the teeth of a rack $r^{12}$. When lifted from engagement with the rack the stop may be slid along the rod $r^{10}$ to any desired position. The stops V are thus mounted so that they normally offer no obstruction to the movement of the carriage, and it will be noticed that if one of said stops should be in position above the block Q when either of the keys P is depressed, said stop will be rocked about the rod $r^{10}$ and not interfere with the operation of the tabulator.

The regular feed of the carriage by the action of the space bar, or upon the depression of any key C or shifter D, is effected by any suitable escapement operating in connection with a rack bar $f^{10}$, Figs. 12, 12$^a$, the carriage tending to move to the left under the action of a spring in a drum $f^{11}$, shown in dotted lines Fig. 2, to the periphery of which is connected a tape, not shown, also attached to the carriage as usual. There are two escapement pawls $f^{13}$, $f^{14}$, engaging the rack $f^{10}$ alternately and operated from the spacing frame R$^3$, Figs. 1, 8, 12 and 13, which rests upon a stud on an arm of a three-armed lever $f^{18}$, Fig. 8. This frame R$^3$ has a cross bar which may be struck by either key frame $c^2$, and which may also be depressed by depressing the frame $f^{23}$ connected with the spacing bar $f^{20}$, the said frame $f^{23}$ being connected by links to arms $f^{24}$, which extend over the frame R$^3$. Springs $f^{25}$ lift the arms $f^{24}$ together with the spacing frame and bar.

When the carriage is to be set by operating a key P to print a figure in a determined column, the usual spacing devices must be thrown out of connection, which is done on pushing in any key P by rocking the pawl $f^{13}$ of the escapement. This is effected by the projection $f^{30}$ on the rod $r'$ coming against the tail of a lever $f^{31}$, Figs. 1, 8 and 12, a pin $f^{32}$ on which hits and swings the pawl from the rack, when the carriage will be left free to run until the stop V contacts with the block Q. When the carriage is thus released, it would tend to run too rapidly and be arrested with a jolt, and therefore there is provided a brake device I, Figs. 1 and 14, in the form of a lever $i^3$ pivoted to the frame, and carrying a brake shoe $i^4$ which may be brought against a cross bar $i^5$ of the carriage, the said lever being swung to bring the shoe against the carriage by contact therewith of the projection $Z^{14}$ on the rod $r'$. The movement of the brake shoe $i^4$ from the carriage is limited by a pin $i^6$.

On depressing any shifter D, the rotation of the shaft Z is made the means of positively feeding the carriage one step through any suitable co-acting devices. As shown, on each rotation of the shaft Z, the frame K is depressed and the cross bar $k^3$ of said frame engages the hook of a link $f^{33}$ which is hung at its upper end to the spacing frame R$^3$, Figs. 8 and 10, and depresses the latter.

So far as the operation of the machine has been described, it will be seen that the shaft Z will be arrested by the detent Z$^2$ and the pin $z^{85}$ at the completion of each rotation. Under certain conditions now to be described, however, it is necessary that there should be two consecutive rotations of the shaft.

The actuating pinions $e$ of the adder are separated uniformly except between those representing the cents and dollars columns, those representing the hundreds and thousands columns and those representing one hundred thousands and millions, and a decimal point is required to be printed in the space between the dollars and cents columns.

With this arrangement, it will be evident that after printing the last figure in the division representing millions or thousands, the carriage and adder must be fed one step without printing so as to leave a space in the printed record between the figures representing millions and hundreds of thousands and thousands and hundreds. It will also be seen that after printing a figure in the units column of the dollar division, the carriage must be fed one space and a decimal point printed before bringing the tens column of the cents division into line. Although different means may be employed to move the carriage automatically, without printing, two steps instead of one step between the proper columns of the dollar division, and to effect the required printing of the decimal point between the dollars and cents, the following devices are effective: As best shown in Figs. 3, 6 and 7, a rock shaft $p^2$ carries three arms $p'$, $p^3$, $p^8$, the arm $p'$ being adapted to bear on the surface of the adder case, which latter has slots $o$ corresponding in position to the spaces between each of the aforesaid divisions of the pinions $e$, a spring $p^{10}$, Fig. 3, on the shaft $p^2$ tending to carry the arm $p'$ toward the adder case. The arm $p^3$ extends opposite a cam $z^{27}$ on the shaft Z which rocks the shaft $p^2$ to carry the arm $p^3$ back just before the feeding of the carriage occurs. A catch lever $p^{18}$ extends below the shaft Z. A lug $z^{12}$ on the shaft Z can depress the front end of the catch lever which is lifted by a spring $z^{13}$, and which has a shoulder $p^{14}$, and a latch $p^{15}$ swings on the shaft $p^2$, a spring $p^{16}$ tending to swing the latch backward and being connected to the arm $p^8$. A stud $p^{19}$ on the latch $p^{15}$ engages the tail of the detent $Z^2$. So long as the arm $p'$ bears against the surface of the adder case, the depression of the detent $Z^2$ will result in one rotation and arrest the shaft Z at the termination thereof, as before described. But if, after a shifter D is depressed, the next feed of the carriage brings a slot $o$ opposite the lever $p'$, the latter will swing to the position shown in Fig. 7, (the cam $z^{27}$ and lug $z^{12}$ having rotated beyond the end of the catch lever $p^{18}$,) and the latch $p^{15}$ will swing forward over the shoulder $p^{14}$ in which position it is held until after the beginning of the second rotation. The stud $p^{19}$ will, as the latch $p^{15}$ is rocked, press on the tail of the detent $Z^2$ and carry the latter down to the position shown in Fig. 7, so that as the shaft Z completes its first rotation, the detent $Z^2$ will be out of engaging position; but after the shaft Z commences its second rotation, the lug $z^{12}$ by contact with the catch lever $p^{18}$, depresses the latter, carrying the shoulder $p^{14}$ below the latch $p^{15}$ allowing it to return to its normal position in contact with the arm $p^8$, (the cam $z^{27}$ having by its action on the arm $p^3$, rocked the shaft $p^2$, and carried the arm $p^8$ backward). The detent $Z^2$ is now free to engage the pin $z^{85}$ and arrest the shaft at the end of the second rotation. When the carriage has moved to such an extent that the last figure printed is in the dollars column, the period or decimal point must be printed before printing the figure in the next cents column. To effect this, the parts just described operate as stated to effect a second feed of the carriage and in connection with devices which bring down the type lever carrying the period or decimal point. This is done by means of a lug $s$, Figs. 18 and 19, upon the casing of the adder E, which lug engages a lever $S'$ connected by a link $S^2$ with the hook $d^{90}$, Fig. 18, by which the frame K may pull down the frame $c^2$ that operates the type bar carrying the period type. When this hook is thus pulled backward, it engages the lug $d^{12}$ of the said farme $c^2$ which is pulled down.

During the before described second rotation of the shaft Z, it is desirable that the shifters D shall remain up in normal position, as if a shifter was depressed after the first rotation, a figure would be printed where there should be a blank space. If the operator removes his finger from the shifter D that is actuated just prior to the beginning of the first of the two successive rotations required under certain conditions, as before described, there would of course be no danger of a reprint being effected by the second rotation. If pressure is maintained on the shifter and the catch $d^7$ is not moved from engagement with the stud $d^{90}$ however a second printing will occur. Therefore means are provided by which even though pressure is maintained on the shifter no printing will take place during the second rotation. This is accomplished by positively lifting the depressed shifter D sufficient to insure the disengagement of the catch $d^7$, which is effected by rock arms $n^4$. Figs. 1, 8, 10 and 22, swinging on the shaft 95 and positively lifted at each rotation of the shaft Z so that each arm $n^4$ may strike the cross bar $z^{93}$ and lift the frame T and the depressed shifter to a limited extent. Any suitable means may be employed for lifting the arms $n^4$. As shown, a sleeve $n^5$, Fig. 3, and dotted lines, Fig. 8, incloses the shaft 95 and the arms $n^4$ are connected to said sleeve, and to one of the arms is pivoted a blade $n^7$ carrying a roller $n^3$, Figs. 10, 22 and 23, which bears on a cam $n^{14}$ on the shaft Z, which cam acts to impart the proper movements to the arms $n^4$. To prevent the depression of a shifter D during the said action of the parts, the frame $n^4$, Fig. 22 and Fig. 23, is retained in its elevated position, to which it is raised by means of the cam $n^{14}$, by a detent arm $m^7$, fulcrumed on a vertical support $m^{20}$ and connected to a spring $m^{21}$ that acts to hold a shoulder thereon in engagement with a stud $m^{12}$ upon the blade $n^7$ connected with the frame $n^4$, and these parts are held in position until the automatic second rotation of the shaft Z has been effected. This results from means employed to prevent the removal of the detent $m^7$ until after the first complete rotation of the shaft Z. To this end, there is mounted on the shaft Z a sleeve $m^2$ which is engaged by a spring $m'$ that tends to move the sleeve in the direction of the arrow, Fig. 23, and carry a projection $m^5$ on the sleeve into the path of the detent $m^7$. On the shaft $p^2$ is an arm $m^9$ carrying a stud $m$, against which an arm $m^{15}$ loosely mounted on the hub of the arm $m^9$ is normally held by a spring $m^{16}$. As the arm $p'$ enters a slot $o$ of the adder casing, the sleeve $m^2$ is moved to the right, Fig. 23, by the arm $m^{15}$ being brought in the path of the spiral face of a cam $m^{17}$ on the sleeve $m^2$. The cam $m^{17}$ is not a solid block but is cup-shaped or has a groove in the face adjacent the arm $m^{15}$ into which a projection $m^{19}$ on said arm extends when the cam and arm are in engagement. The arm and cam are thus held in engagement and the arm $m^{15}$ prevented from moving with the arm $m^9$ to the position indicated in dotted lines in Fig. 22 until the second revolution of the shaft Z has begun when the cam passes from engagement with the arm $m^{15}$ and the spring $m^{16}$ immediately returns said arm to its normal position against the stud $m$. After the beginning of the second rotation, when the arm $m^{15}$ is released from the cam, as above described, and returned to its normal position by its spring $m^{16}$, the spring $m'$ carries the sleeve $m^2$, which turns with the shaft, to the left and brings the lug $m^5$ beneath the tail of the catch $m^7$ and swings the latter away from the stud $m^{12}$ and allows the blade $n^7$ and the frame $n^4$ to drop so that the shifters are no longer obstructed in their movement. The frame $n^4$ is thus kept elevated as the shaft Z completes its first rotation, and until after it has begun its second rotation, so that its operations cannot be interfered with by depressing a shifter.

As the frame T is, as just described, lifted by the frame $n^4$ at each revolution of the shaft Z it will be seen that the shoulder $Z^{10}$ on the catch $Z^3$ will be carried at each revolution above the end of detent $Z^2$ and if the previously depressed shifter D is still pressed by the operator the frame T will be instantly forced down as the frame $n^4$ moves from engagement therewith and such downward movement of the frame T will cause the catch $Z^3$ to again trip the detent $Z^2$ and cause another revolution of the shaft Z, and this operation would be repeated so long as pressure was maintained on the shifter D. To prevent this during the normal operation of the machine the catch $Z^2$ extends up between guides $y$, $y$ on the frame, each of said guides having an inwardly extending projection $Y^3$. Adjacent its upper end the catch $Z^3$ is provided on opposite sides with projecting ribs $y'$. When the frame T is elevated said ribs $y'$ are above the guides $y$, and when the catch $Z^3$ is carried to trip the lever $Z^2$, said ribs project somewhat below the guides. As the shaft Z revolves, the pin or stud $z^{85}$ contacts with the catch $Z^3$ and rocks it about its pivot to carry the shoulder $Z^{10}$ from above the lever $Z^2$ and permit the latter to rise. The movement thus imparted to the catch $Z^3$ by the pin $z^{85}$ carries the upper end of the catch forward and brings the ribs $y'$ thereon between the projections $y^3$ on the guides $y$. The ribs $y'$ are engaged by the projections $y^3$ and the catch $Z^3$ held in position where its shoulder $Z^{10}$ will not engage the lever $Z^2$ until the frame T moves upward to its highest position when said ribs will be carried above the projections $y^3$ and the catch $Z^3$ returned to its original position by the spring $Z^{12}$. It will be understood that the partial upward movement of the frame T by the frame $n^4$ is not sufficient to release the ribs $y'$ from the projections $y^3$. The ribs $y'$ also act in connection with the projections $y^3$ to positively prevent the depressing of any of the shifters when an adder E is not in proper position to be acted on by the sector H. That is when the lever N is not engaged by the rib $n$ on the adder casing the plate $n^{44}$ holds the upper end of the catch $Z^3$ in a position where the ribs $y'$ are directly above the projections $y^3$, and therefore the catch $Z^3$ is prevented from moving down; and as it is impossible to depress a shifter without depressing the frame T and the catch $Z^3$ is connected with said frame and is locked by the ribs $y'$ and projections $y^3$ from downward movement, it will be impossible to depress a shifter until after the rib $n$ on an adder casing has caused the lever N to move the catch $Z^3$ to the position shown in full lines in Fig. 6.

To correct an error of depressing a wrong shifter, which would result in turning the coöperating adder pinion to indicate a number other than that desired, the shifter representing the complement of the number on the shifter wrongly depressed is actuated and causes the pinion that has been wrongly turned to be further turned until restored to the position occupied before the error was made. Thus, if it is desired to print and record the figure "5," but by mistake the shifter "6" is depressed, turning the pinion $e$ six steps, the operator by depressing the shifter "4," completes one rotation of the pinion restoring it to its original position, and after this is done, the proper shifter is depressed. It will be understood that before depressing the second shifter, representing the complement of the shifter erroneously operated, the carriage G will be moved to the right to restore the platen to the position it occupied when the wrong shifter was operated and it is also necessary to prevent any feed of the carriage upon striking the complement shifter in order that the latter may operate upon the same pinion that was improperly moved when the first shifter was depressed. This feed is prevented by throwing back the hook $f^{33}$, Figs. 8 and 10, carried by the spacing frame $R^3$ by means of a cam edge $v^2$ on the stem of a correcting key $V^2$, which cam edge strikes a stud $v^3$ on the hook and swings it out of engaging position. The correction key $V^2$ is guided in its movements by a guide piece $V^{12}$ on the frame of the machine, and in addition to shifting the hook $f^{33}$, as described, the lower end of said key when depressed bears on the rod $k^8$, which projects beyond one side of the frame K, and thereby depresses all of the hooks $d^{60}$ so that they will be beneath the pins $d^{12}$ and therefore no printing action will occur on the operation of any shifter while the correction key is depressed.

It will be evident that ordinarily on turning any one of the pinions $e$, a complete rotation, if anything has been added thereon, there will be a carrying action to the next higher column by the action of the parts connected with the carrier $e'$, and to prevent this when the parts are operated as above described, the carrying devices for that adding train must be held back out of action. When the correction key is depressed the part $e'$ of each carrying device, Figs. 1, 10, 24, is pushed inward by a blade $e^{22}$. The blade $e^{22}$ is connected at $e^{16}$ to an arm $e^{26}$ on a rock shaft $e^{17}$ having thereon arms $e^{27}$. In the arms $e^{27}$ is mounted a rock shaft $t^8$ and an arm $t^5$ connected with one end of said shaft $t^8$ extends beneath a stud or pin $t^4$ on the blade of the correction key. On depressing the correcting key $V^2$, the pin $t^4$ is brought against the arm $t^5$ upon the shaft $t^8$ carrying a finger $t^6$ mounted at the opposite end of shaft $t^8$ in the path of a stud $t^{11}$, upon the blade $h^{14}$, so that as the latter is pushed backward with the sector H, the blade $e^{22}$ will be moved toward the adder and will push and hold in the part $e'$ and prevent any carrying to the next pinion during that action of the sector H.

It will be seen that the effect of depressing any shifter is to set the co-acting catch $d^7$ in position to engage the stud $d^{90}$ of the opposite plate 100, Fig. 1, and at the same time to depress the frame T, Fig. 6, and thereby shift the detent $Z^2$ so that the continuously running motor is put in connection through the intermediate devices with the parts that actuate both the adding mechanism and the associated element of the recording mechanism, and that on the completion of a single action of each mechanism the parts are automatically disconnected from the motor.

The hooks $d^{60}$ extend up through the plate $a$ of the frame and to the underside of the top of this plate, adjacent each slot for the hooks, is secured a guide having two walls, 1, 2, extending at right angles to each other. The guides are secured to the plate by screws 4 passing through a lip 5 at the upper end. A slot 6 is formed at the upper end of the guide wall 2, and a pin 7 on the hook $d^{60}$ is in alinement with said slot when the hooks are elevated and disconnected from the pins $d^{12}$. When either hook $d^{60}$ is swung forward to engage its co-acting pin $d^{12}$, the pin 7 passes through the slot 6 and during the reciprocation of the hook the wall 2 of the guide positively prevents the pin 7 from moving rearward and therefore the hook cannot be disengaged from the pin $d^{12}$ of the printing device until the end of the stroke is completed, when the pin 7 is again in alinement with the slot 6 and can move rearwardly through it.

From the above it will be evident that the parts D are not keys in any sense, and that they are not moved by the motor or otherwise to convey motion to either the adding or recording mechanisms, but they are simply means for setting parts in position to be thereafter operated by the action of the motor and for releasing the detent which holds the parts out of connection with the motor.

It will be seen that the carriage is fed step by step by means operated from the numeral keys of the typewriter mechanism and that it is also fed automatically step by step by the action of parts deriving their movement from the motor, and further that the latter will automatically feed two steps where required to leave spaces between different divisions of numbers and will automatically print a decimal point on feeding between the dollars and cents columns.

While I have shown the shifters as consisting of vertically movable stems provided with numbered heads, I do not limit myself to such a construction, nor is it necessary to number the shifters, nor do I limit myself to recording mechanism of any special character.

It will be evident that the reciprocating rack shown as a sector H may be straight, and may be normally in its lowest position and lifted to operate the adder mechanism.

While the projections $s$, $n$ are shown on the case of the adder, it will be evident that they may be carried by any other suitably moving part of the apparatus, and the adding mechanism may be carried either by or with the carriage.

No claim is herein made for certain of the features of the machine which have been particularly described, as they are the invention of J. G. Kingsbury, and form the subject-matter of applications for patent filed by him. Nor is any claim herein made for those features of the machine which are claimed in a co-pending application of William H. Pike, Jr., Serial Number 235,980 as the present invention does not include features common to the machine illustrated in this application and in said application of Pike. Such features, however, are illustrated herein in order that a complete mechanism may be disclosed.

I do not claim the carrying mechanism or the tabulating mechanism herein shown as the same are the invention of J. G. Kingsbury and constitute the subject-matter of applications for patent Serial Numbers, 311,993 and 318,207, filed by him.

Without limiting myself to the details of construction shown or to the combinations set forth, as some of the features may be used separately in other machines, I claim:—

1. In an adding and recording machine, the combination of adding mechanism, a recording mechanism, a series of numbered keys for operating the members of the latter, a corresponding series of shifters, a continuously running motor, and devices supported independently of but adjustable from the different shifters to connect the members of the recording mechanism independently with the motor.

2. In an adding and recording machine, the combination of adding mechanism, a recording mechanism including a traveling platen, a series of numbered keys for operating the members of the latter, a corresponding series of shifters, a continuously running motor, devices supported independently of but adjustable from the different shifters to connect the members of the recording mechanism independently with the motor, and means operated from the motor for shifting the platen after each record.

3. The combination with recording mechanism and operating keys therefor, of adding mechanism, a series of shifters, one to each of said recording keys, and devices supported independently of the shifters and arranged to be shifted by said shifters to positions to operatively connect the adding and recording mechanisms.

4. The combination with recording mechanism and operating keys therefor, of adding mechanism, a series of shifters, one to each of said recording keys, and devices supported independent of said shifters arranged to be shifted by said shifters to positions to operatively connect the adding and recording mechanisms.

5. The combination with recording mechanism and a movable platen and operating keys therefor, of adding mechanism movable with the platen, a series of shifters, one to each of said recording keys, devices normally independent of said shifters arranged to be shifted by said shifters to positions to operatively connect the adding and recording mechanisms, and means for automatically moving the platen and adding mechanism after shifting any shifter.

6. The combination with recording mechanism and operating keys therefor, of adding mechanism, a motor, a series of shifters, one to each of said recording keys, and devices supported independently of the shifters and arranged to be shifted by said shifters to positions to operatively connect the adding and recording mechanisms with the motor.

7. The combination with recording mechanism, operating keys therefor and a traveling platen, of adding mechanism connected to travel with the platen, a motor, a series of shifters, one to each of said recording keys, normally independent devices arranged to be shifted by said shifters to positions to operatively connect the adding and recording mechanisms with the motor, and means for automatically moving the platen and adding mechanism one step after shifting each shifter.

8. The combination with the numeral finger keys and connected members of a typewriter, of a corresponding series of shifters, adding mechanism, a rotatable shaft, and means supported independently of and movable from the shifters to operatively connect any member of the recording mechanism and the adding mechanism with the shaft.

9. The combination with the numeral finger keys and connected members of a typewriter recording mechanism, of a corresponding series of shifters, adding mechanism, a rotatable shaft, and means supported independently of and movable from the shifters to operatively connect any member of the recording mechanism and the adding mechanism with the shaft.

10. The combination in a combined typewriter and adder having numeral finger keys, recording members connected therewith, adding mechanism, and a rotatable shaft, of a series of shifters, and means supported independently of the shifters whereby to connect the adding mechanism and a recording member operatively with the shaft on shifting the corresponding shifter.

11. The combination in a combined typewriter and adder having numeral finger keys, recording members connected therewith, adding mechanism, a rotatable shaft, and a continuously rotating motor, of a series of shifters, and means normally independent of the shifters whereby to connect the adding mechanism and a recording member operatively with the shaft and to connect the latter and the motor, on shifting the corresponding shifter.

12. The combination in a combined typewriter and adder having numeral finger keys, recording members connected therewith, adding mechanism, a rotatable shaft, and a continuously rotating motor, of a series of shifters, means independent of the shifters whereby to connect the adding mechanism and a recording member operatively with the shaft, and to connect the latter and the motor, on shifting the corresponding shifter, and automatic means for disconnecting the motor and shaft after one operation of the parts.

13. The combination in a combined typewriter and adder, of recording mechanism, numeral finger keys connected each to operate a member of the recording mechanism, adding mechanism, a shaft for actuating both mechanisms, a series of shifters, and devices supported independently thereof and adjustable thereby, for operatively connecting the members of the recording mechanism separately with the shaft.

14. The combination in a combined typewriter and adder, of recording mechanism, numeral finger keys connected each to operate a member of the recording mechanism, adding mechanism, a shaft for actuating both mechanisms, a series of shifters, and devices supported independently thereof and adjustable thereby, for operatively connecting the adding mechanism and the members of the recording mechanism separately with the shaft.

15. The combination with the members of a recording mechanism, of series of catches and means for reciprocating the same, independent parts adapted to be moved by said catches to shift co-acting members of the recording mechanism, and a series of shifters normally independent of the catches, each adapted to engage and shift one of the catches into position to connect with one of said parts.

16. The combination with the members of a recording mechanism, of a shaft, a series of catches and means for reciprocating the same from the shaft, normally independent parts adapted to be moved by said catches to shift co-acting members of the recording mechanism, and a series of shifters independent of the catches, each adapted to engage and shift one of the catches into position to connect with one of said parts.

17. The combination of adding and recording mechanism, keys for operating numeral members of the recording mechanism, a rotatable shaft, catches reciprocated from the shaft and separately adapted to be put into operative connection with said members, a series of shifters, and means for shifting the said catches into operative position therefrom.

18. The combination with the numeral keys of a typewriter and with a corresponding series of shifters, of adding mechanism, a rotatable shaft, a continuously running motor, and positive means for connecting the shaft and motor and for connecting the shaft operatively with the adding mechanism and with the said keys on shifting any shifter.

19. The combination with the numeral keys of a typewriter and with a corresponding series of shifters, of adding mechanism, a rotatable shaft, a continuously running motor, and means whereby, on shifting any shifter, to connect its associated numeral key operatively with the shaft and the latter positively with the motor.

20. The combination with the numeral keys of a typewriter and with a corresponding series of shifters, of adding mechanism, a rotatable shaft, a continuously running motor, and means whereby on shifting any shifter to connect its associated numeral key and the adding mechanism operatively with the shaft and the latter positively with the motor.

21. The combination with the numeral keys and carriage of a typewriter, and with a corresponding series of shifters, of adding mechanism carried by the carriage, a rotatable shaft, a continuously running motor, and means whereby on shifting any shifter to connect its associated numeral key operatively with the shaft, and the latter positively with the motor.

22. The combination with the numeral keys and carriage of a typewriter, and with a corresponding series of shifters, of adding mechanism carried by the carriage, a rotatable shaft, a continuously running motor, and means whereby on shifting any shifter to connect its associated numeral key and the adding mechanism operatively with the shaft and the latter positively with the motor.

23. The combination with adding and recording mechanism, of movable blades 100, means for operating the adding and recording devices therefrom, power devices, a series of shifters, and means whereby the blades are separately and operatively connected with said power mechanism on shifting the co-acting shifter.

24. The combination with recording and adding mechanisms, of an intermittently rotatable shaft carrying a series of cams, a series of finger keys for operating the members of the recording mechanism, a corresponding series of movable shifters, and devices whereby on shifting any shifter, its co-acting recording member and the adding mechanism are brought into operative connection with the shaft.

25. The combination with recording and adding mechanisms, of an intermittently rotatable shaft carrying a series of cams, a motor for operating the shaft, a series of finger keys for operating the members of the recording mechanism, a corresponding series of movable shifters, and devices whereby on shifting any shifter, its co-acting recording member and the adding mechanism are brought into operative connection with the shaft and the shaft is connected with the motor.

26. The combination with recording and adding mechanisms, of a series of keys for operating the members of the recording devices, a corresponding series of shifters, a continuously running motor, means for operating the recording and adding mechanisms from the motor, and means independent of and operable from the shifters for bringing the motor into operative connection with the said means.

27. The combination with recording and adding mechanisms, of a series of keys for operating the members of the recording devices, a corresponding series of shifters, a continuously running motor, means for operating the recording and adding mechanisms from the motor, means independent of and operable from the shifters for bringing the motor into operative connection with the said means, and means for automatically disconnecting the motor on the completion of each adding and recording operation.

28. The combination with the numeral keys and type and traveling platen of a typewriter, of adding means connected to travel with the platen, means for operating the adding means a motor, devices for connecting it to operate the recording and adding means, means for automatically disconnecting it therefrom after each adding and recording operation, and means for insuring the connection of the motor and said connecting devices only when the adding means is in position to coact with its operating means.

29. The combination with the numeral keys and type and traveling platen of a typewriter, of adding mechanism connected to travel with the platen, a rotatable shaft, devices for operating the adding mechanism and numeral type therefrom, a continuously running motor, and means for positively connecting the motor with and disconnecting it from the shaft.

30. The combination with the numeral keys and type and traveling platen of a typewriter, of adding mechanism connected to travel with the platen, a rotatable shaft, devices for operating the adding mechanism and numeral type therefrom, a continuously running motor, a series of shifters, and devices operable from each shifter for bringing the motor into connection with the shaft.

31. The combination with the numeral keys and type and traveling platen of a typewriter, of adding mechanism connected to travel with the platen, a rotatable shaft, devices for operating the adding mechanism and numeral type therefrom, a continuously running motor, and means for disconnecting the motor and shaft after each adding and recording operation.

32. The combination with the numeral keys and type and traveling platen of a typewriter, of adding mechanism connected to travel with the platen, a rotatable shaft, devices for operating the adding mechanism and numeral type therefrom, a continuously running motor, a series of shifters, a detent for said shaft, and devices operable from each shifter for bringing the motor into connection with the shaft and for shifting said detent.

33. The combination in a combined typewriter and adder, of letter type and keys, numeral type shifters, adding means, a shaft from which said means may be operated, a motor, means for positively connecting and disconnecting the shaft and motor, and an adjustable detent for arresting the rotation of the shaft, and means between the shifters and the detent for shifting the latter to permit the shaft and motor to be connected.

34. In a combined typewriter and adder, adding and recording means, a shaft and means for operating the adding and recording means therefrom, a detent for said shaft, a motor, devices for connecting the shaft with the motor, a series of shifters, and means for bringing said devices into position to connect the shaft and motor and for shifting the detent on shifting any one of the shifters.

35. In a combined typewriter and adder, a shaft and means for operating the adding and recording means therefrom, a detent for said shaft, a motor, devices for connecting the shaft with the motor, a series of shifters, means for bringing said devices into position to connect the shaft and motor and for shifting the detent on shifting any one of the shifters, and means for automatically disconnecting the shaft and motor after each adding and recording operation.

36. A combined typewriter and adding machine provided with a working shaft, a series of blades, devices for connecting the shaft operatively with the recording and adding mechanism, a series of shifters, and means whereby the shaft is brought into operation upon each blade to shift the same on shifting the co-acting shifter.

37. The combination with adding and recording mechanisms, of a working shaft, means for imparting movement to the said mechanisms from said shaft, a continuously running motor, a series of shifters, and devices whereby to effect a positive connection between the motor and shaft on shifting any shifter.

38. The combination with the adding and recording mechanisms, of a working shaft, means for imparting movement to the said mechanisms from said shaft, a continuously running motor, a series of shifters, devices whereby to effect a positive connection between the motor and shaft on shifting any shifter, and means for automatically disconnecting the motor and shaft after a number is added and recorded.

39. In a combined typewriter and adder having recording and adding mechanism, a working shaft, devices for operating the recording and adding mechanisms and feeding the latter step by step from said shaft, a motor, a series of shifters, means for operatively connecting the shaft and motor on shifting any shifter, and means normally for disconnecting them after each adding and recording operation and means for securing a second feeding and operation from the shaft when a space between the numerals recorded is required and thereafter arresting the shaft.

40. The combination in a typewriter and adder, of recording mechanism, including a carriage and platen supported to travel therewith, an adding mechanism connected to move with the platen, a working shaft, means for feeding the carriage step by step by the action of the shaft in adding and recording, and additional means for automatically repeating the feeding action where wider spaces are required between the numerals of the record.

41. The combination in a typewriter and adder, of recording mechanism, including a carriage and platen, an adding mechanism connected to move with the platen, a working shaft, means for feeding the carriage step by step by the action of the shaft in adding and recording, and means for automatically feeding one step and printing a decimal point between the dollars and cents division of the figures recorded.

42. The combination in a typewriter and adder, of recording mechanism, including a carriage and platen, an adding mechanism connected to move with the platen, a slotted case therefor, a working shaft, means for feeding the carriage step by step by the action of the shaft in adding and recording, means for arresting said shaft at the termination of each rotation, a lever arranged to bear on said case and to enter the slots thereof, and connections whereby said arresting means are rendered inoperative when the case is in position for the lever to enter a slot.

43. The combination in a typewriter and adder, of recording mechanism, including a carriage and platen, an adding mechanism connected to move with the platen, a slotted case therefor, a rotatable working shaft, means for feeding the carriage step by step by the action of the shaft in adding and recording, means for arresting said shaft at the termination of each rotation, a lever arranged to bear on said case and to enter the slots thereof, connections whereby said arresting means are rendered inoperative when the case is in position for the lever to enter a slot, and means for carrying the lever out of the slot after the shaft has begun a second rotation.

44. The combination in a combined typewriter and adder, of a carriage and platen, and means for automatically feeding the carriage after each recording action, means for automatically repeating the feeding action where greater intervals between figures are required, and means for preventing the printing of a figure on such repeated feeding action.

45. The combination in a combined typewriter and adder with a lever and a decimal printing character carried thereby, of means for operating said lever automatically after the last figure has been printed in one of the divisions of a number.

46. The combination in a typewriter and adder, of recording mechanism including a carriage and a platen supported to travel therewith, an adding mechanism connected to move with the platen, carriage feeding means, a working shaft, a motor for actuating said shaft, means for arresting the shaft at the end of each rotation in adding and recording, and means for automatically restraining the arresting means to permit two rotations for securing a double feeding action and a greater space between the numerals printed after the last numeral is printed in any division of a column.

47. The combination with the ratchet wheels of an adder, of movable carriers supported to reciprocate longitudinally, pawls on the carriers for engaging said wheels, means for positively moving the carriers in one direction as the wheels are moved in adding, and means actuated on the completion of a movement of each ratchet for moving the carriers in the opposite direction.

48. The combination with the ratchet wheels of an adder, of longitudinally reciprocating carriers, pawls carried thereby engaging said wheels, means for moving said carriers independently in one direction to actuate said wheels, and a reciprocating device for simultaneously and positively moving all of said carriers in the opposite direction.

49. The combination with the recording mechanism including a platen and means for moving it longitudinally step by step, of adding mechanism provided with means for carrying from one member to the next higher member, a working shaft for actuating said recording and adding mechanisms, devices operable from said shaft for setting said carrying means in operative position, a correcting key, and means operative therefrom for preventing feed of the carriage when the adder is actuated to make corrections.

50. The combination with the recording mechanism including a platen and means for moving it step by step, of adding mechanism provided with means for carrying from one member to the next higher member, a working shaft for actuating said recording and adding mechanisms, devices operable from said shaft for setting said carrying means in operative position, a correcting key, and means operative therefrom for preventing any carrying action in the adding mechanism when the said adding mechanism is operated to make corrections.

51. The combination with the recording mechanism including a platen and means for moving it step by step, of adding mechanism provided with means for carrying from one member to the next higher member, a working shaft for actuating said recording and adding mechanisms, devices operable from said shaft for setting said carrying means in operative position, a correcting key, and means operative therefrom for preventing any carrying action in the adding mechanism or feed of the carriage when the adding mechanism is being operated in making corrections.

52. The combination in a combined typewriter and adder and adding and recording mechanism thereof, of a working shaft and means for operating the adding and recording mechanisms therefrom, a detent for arresting the shaft at the end of each operation, and automatic devices which shift said detent to permit a second operation of the shaft when the adding mechanism is in certain positions.

53. The combination with the recording mechanism, platen, carriage, and adding mechanism carried with the carriage, of a working shaft for operating said mechanism, projections $s$, $n$, supported to be carried with the adding mechanism and means shiftable from said projections to vary the action of the shaft on said mechanisms.

54. The combination of a typewriter, its carriage, adding mechanism connected to move with the carriage, carrying devices, parts $e'$ connected with the carrying devices, a pusher $e^2$, and means for carrying it into contact with said parts to set the same prior to each operation of said mechanism.

55. The combination in a combined typewriter and adder of adding mechanism, carrying devices, parts $e'$ connected with the carrying devices of said mechanism, a blade $e^{22}$, means for carrying it into contact with either of said parts to set the same, a correction key, and means actuated thereby for operating the means for shifting said blade to prevent the operation of the carrying device engaged thereby when making corrections.

56. The combination with the adding mechanism of a combined typewriter and adder having a series of pinions $e$ of a rack for engaging said pinions, a rotatable working shaft, connections whereby said rack is carried to and from said pinions by the action of said shaft, a series of shifters, and a series of co-acting blades, the latter provided with contact pieces differently arranged to vary the extent of movement of the rack.

57. The combination with the adding mechanism and its pinions, of a rack-carrier and rack connected therewith and movable to and from said pinions, means for moving the carrier while in engagement with the pinions, and a series of blades with wings differently arranged to engage the rack-carrier to move and define the extent of movement thereof.

58. The combination with the adding mechanism and its pinions, of a blade and means for carrying it toward and from the adding mechanism, a curved rack and rack carrier pivoted to said blade, a series of blades 100, and means for moving the rack therefrom while in engagement with the pinions.

59. The combination with the adding mechanism and its pinions, and carrying devices, of a blade and means for carrying it toward and from the adding mechanism, a curved rack and rack carrier pivotally connected to said blade, a series of blades 100, means for moving the rack therefrom while in engagement with the pinions, and means for shifting said blades.

60. The combination with the adder mechanism and carrying devices thereof, its pinions, a rack for engaging said pinions, a movable carrier to which the rack is pivoted, a movable blade $e^{22}$ adapted to engage and shift the carrying devices, a correction key and means operable from said key whereby the blade $e^{22}$ is carried with the rack carrier on its movement toward the adder mechanism.

61. The combination of the adding mechanism and its pinions $e$, blade $h^{14}$, toothed sector pivotally connected with the blade, and means for reciprocating the blade and for moving the sector to different positions in engagement with the pinions.

62. The combination of the adding mechanism and its pinions $e$ and carrying devices having parts $e'$, blade $h^{14}$, toothed sector pivotally connected with the blade, means for reciprocating the blade and for moving the sector to different positions while in engagement with the pinions and the movable blade, a pusher $e^2$, and means independent of the blade $h^{14}$ for carrying the pusher $e^2$ into contact with the parts $e'$.

63. The combination of the adding mechanism and its pinions $e$ and carrying devices having parts $e'$, blade $h^{14}$, toothed sector pivotally connected with the blade, means for reciprocating the blade and for moving the sector to different positions while in engagement with the pinions and the movable blade, a pivotally mounted blade $e^{22}$, a stop on the blade $h^{14}$, devices connected with the blade $e^{22}$, and a correcting key adapted to shift said devices to position in the path of said stop.

64. In a machine of the character described having recording and adding mechanism and a series of shifters, means for making corrections after shifting the wrong shifter, and means for preventing a carrying action in the adding mechanism during such correction.

65. In a machine of the character described having recording and adding mechanism and a series of shifters and means for laterally feeding the adding mechanism, means for making corrections after shifting the wrong shifter, and means for preventing a lateral feeding action of the adding mechanism during such correction.

66. In a machine of the character described having adding and recording mechanism and a series of shifters and means for feeding and carrying the adding mechanism, means for making corrections after shifting the wrong shifter, and means for preventing a feeding action and a carrying action in the adding mechanism during such correction.

67. In a machine of the character described, the combination with the adding mechanism, means for moving the said mechanism laterally and series of shifters, of the working shaft and cam, frame $n^4$, blade $n^7$, detent $m^7$, sleeve $m^2$ with its lug $m^5$ and cam $m^{17}$ having an inclined face, spring $m'$, movable arm $m^{15}$ for engaging the said face, and means for shifting said arm according to the position of the adding mechanism.

68. In a machine of the character described, the combination with the working shaft and series of catches movable therefrom, of cam blades 100, with studs adapted to be engaged by the catches, and shifters provided with means for shifting the catches into position to engage the studs.

69. In a machine of the character described, the movable rack and carrier therefor, a series of blades 100 with wings to engage said carrier, a working shaft, and means for moving the plates separately therefrom.

70. In a machine of the character described having recording and adding mechanism and a series of shifters, the combination with the working shaft, and means for actuating the adding and recording mechanism therefrom, a detent, motor and intermediate clutch mechanism, of a catch $Z^3$ for engaging the detent, and means for shifting the catch on shifting any shifter.

71. In a machine of the character described having adding and recording mechanism and a series of shifters, the combination with the working shaft, and means for actuating the adding and recording mechanism therefrom, a detent, motor and intermediate clutch mechanism, of a catch $Z^3$ for engaging the detent, means for shifting the catch on shifting any shifter, and a projection carried with the shaft for disconnecting the catch and detent.

72. In a machine of the character described having adding and recording mechanism and a series of shifters, the combination with the working shaft, its detent, motor and intermediate clutch mechanism, of a catch $Z^3$ for engaging the detent, means for shifting the catch on shifting any shifter, a projection carried with the shaft for disconnecting the catch and detent, guides $y$, $y$, having projections $y^3$, supports adjacent to the catch and means on the catch for engaging said projections.

73. In a combined recording and adding mechanism including number keys and a traveling platen, means for moving the platen step by step on operating said keys, adder mechanism and a stop V carried with the platen, a series of shifters and means arranged to be actuated thereby for setting parts in position to co-act with the adder mechanism, a block Q adjustable on the carriage to different positions to make contact with said stop, and means for carrying the block out of contact position on shifting any shifter.

74. In a combined recording and adding mechanism including number keys and a traveling platen, means for moving the platen step by step on operating said keys, adder mechanism and a stop V carried with the platen, a series of shifters and means coacting therewith for setting parts in position to co-act with the adder mechanism, a block Q adjustable on the carriage to different positions to make contact with said stop, a series of tabulator keys, and connections for so setting the block to different positions by said keys.

75. In a combined typewriter and adder, the combination with the adding mechanism and with the rotatable shaft, of a series of blades and connections for operating the adding mechanism, a series of shifters, and means operable from each shifter for connecting the adjacent blade with the adding mechanism.

76. The combination with the adding mechanism having a series of pinions, of a rack for operating the pinions, printing mechanism and means for actuating the rack and printing mechanism, and means for connecting the parts of the machine to start the operation of the printing mechanism before the rack completes its movement.

77. The combination in a typewriter and adder, of recording mechanism including the carriage and platen, an adding mechanism connected to move with the platen, a rotatable working shaft, means for feeding the carriage step by step by the action of the shaft in adding and recording, means for arresting the shaft at the termination of each rotation, a lever adjustable to different positions by contact with the adding mechanism, connections whereby the arresting means are rendered inoperative when the lever is in certain positions, and means for shifting the position of the lever after the shaft has begun a second rotation.

78. The combination in a combined recording and adding mechanism of a movable platen and means for feeding the same step by step, means for adjusting the parts of the adding mechanism that accumulate values therein, a correcting key and means for readjusting the said parts of the adding mechanism therefrom, and means operable from the said key for preventing any feed of the platen when operating the said parts in making corrections.

In testimony whereof I affix my signature in presence of two witnesses.

FREDERICK A. HART.

Witnesses:
JOHN T. LANGHORNE,
JERE G. KINGSBURY.